(12) United States Patent
Ota et al.

(10) Patent No.: US 7,554,766 B2
(45) Date of Patent: Jun. 30, 2009

(54) MAGNETIC HEAD FOR PERPENDICULAR MAGNETIC RECORDING IN WHICH GAP THICKNESS AND POLE LAYER SHAPE ARE DEFINED FOR SUPPRESSING OCCURRENCE OF POLE ERASE PHENOMENON

(75) Inventors: Norikazu Ota, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 496 days.

(21) Appl. No.: 11/304,769

(22) Filed: Dec. 16, 2005

(65) Prior Publication Data

US 2006/0158779 A1 Jul. 20, 2006

(30) Foreign Application Priority Data

Dec. 27, 2004 (JP) ............................. 2004-375957
Nov. 28, 2005 (JP) ............................. 2005-342255

(51) Int. Cl.
*G11B 5/127* (2006.01)
(52) U.S. Cl. ................................. 360/125.15
(58) Field of Classification Search ................................
360/125.01–125.75
See application file for complete search history.

(56) References Cited

U.S. PATENT DOCUMENTS 4,656,546 A 4/1987 Mallory

2004/0190197 A1 9/2004 Watabe et al.
2004/0212923 A1 10/2004 Taguchi
2006/0002014 A1* 1/2006 Sasaki et al. ................ 360/125

FOREIGN PATENT DOCUMENTS

| JP | A-2003-296906 | 10/2003 |
| JP | A-2004-295987 | 10/2004 |
| JP | 2004-326990 | 11/2004 |

* cited by examiner

*Primary Examiner*—A. J. Heinz
(74) *Attorney, Agent, or Firm*—Oliff & Berridge, PLC

(57) ABSTRACT

A magnetic head for perpendicular magnetic recording comprises: a pole layer, a write shield layer, and a gap layer provided between the pole layer and the write shield layer. The pole layer incorporates a track width defining portion and a wide portion. The track width defining portion has an end located in a medium facing surface and defines the track width. The wide portion is coupled to the other end of the track width defining portion and has a width greater than the width of the track width defining portion. The value of NH×TH/WG is greater than zero and smaller than or equal to 0.85 μm, where NH is the distance from the medium facing surface to the boundary between the track width defining portion and the wide portion, WG is the space between the pole layer and the write shield layer taken in the medium facing surface, and TH is the distance from the medium facing surface to a point at which the space between the pole layer and the write shield layer starts to be greater than WG.

12 Claims, 23 Drawing Sheets

MAGNETIC HEAD FOR PERPENDICULAR MAGNETIC RECORDING IN WHICH GAP THICKNESS AND POLE LAYER SHAPE ARE DEFINED FOR SUPPRESSING OCCURRENCE OF POLE ERASE PHENOMENON

BACKGROUND OF THE INVENTION

1. Field of the Invention

The present invention relates to a magnetic head for perpendicular magnetic recording that is used for writing data on a recording medium by means of a perpendicular magnetic recording system and to a head gimbal assembly, a head arm assembly, and a magnetic disk drive each of which incorporates the magnetic head for perpendicular magnetic recording.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

It is known that there are types of magnetic heads for the perpendicular magnetic recording system one of which is a single-pole head as disclosed in Japanese Published Patent Application 2003-296906 and another one of which is a shield-type head as disclosed in U.S. Pat. No. 4,656,546 and Japanese Published Patent Application 2004-295987.

The single-pole head comprises: a medium facing surface that faces toward a recording medium; a coil for generating a magnetic field corresponding to data to be written on the recording medium; a pole layer (main pole) having an end face located in the medium facing surface, allowing a magnetic flux corresponding to the field generated by the coil to pass therethrough, and generating a write magnetic field for writing the data on the recording medium by means of the perpendicular magnetic recording system; an auxiliary pole having an end face located in the medium facing surface and having a portion that is located away from the medium facing surface and coupled to the pole layer; and a gap layer made of a nonmagnetic material and provided between the pole layer and the auxiliary pole. In the medium facing surface, the end face of the auxiliary pole is located backward of the end face of the pole layer along the direction of travel of the recording medium.

The shield-type head comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium by means of the perpendicular magnetic recording system; a shield layer having an end face located in the medium facing surface and having a portion that is located away from the medium facing surface and coupled to the pole layer; and a gap layer made of a nonmagnetic material and provided between the pole layer and the shield layer. In the medium facing surface, the end face of the shield layer is located forward of the end face of the pole layer along the direction of travel of the recording medium with a specific small space. In the shield-type head, the shield layer is capable of making the magnetic field gradient abrupt by taking in the magnetic flux generated from the pole layer. As a result, the shield-type head is capable of further improving the linear recording density. The magnetic field gradient means an amount of change of components orthogonal to the surface of the recording medium among components of the magnetic field generated from the pole layer, the amount of change being taken per unit length along the direction of travel of the recording medium.

In each of the single-pole head and the shield-type head, the pole layer incorporates a track width defining portion and a wide portion, for example. The track width defining portion has an end located in the medium facing surface, and defines the track width. The wide portion is coupled to the other end of the track width defining portion and has a width greater than the width of the track width defining portion. The track width defining portion has a nearly uniform width. For example, the wide portion is equal in width to the track width defining portion at the interface with the track width defining portion, and gradually increases in width as the distance from the medium facing surface increases and then maintains a specific width to the end of the wide portion.

It is a reduction in track width, that is, a reduction in width of the end face of the pole layer located in the medium facing surface, and improvements in write characteristics that is particularly required for magnetic heads to achieve higher recording density. On the other hand, if the track width is reduced, write characteristics such as an overwrite property that is a parameter indicating an overwriting capability suffer degradation. Therefore, it is required to achieve better write characteristics as the track width is reduced.

In a magnetic head for perpendicular magnetic recording, it is known that there sometimes occurs a phenomenon in which data stored on a recording medium is erased by a magnetic field produced by the pole layer due to residual magnetization of the pole layer except when writing is performed, which is hereinafter called a pole erase phenomenon.

The likelihood of an occurrence of the pole erase phenomenon depends on the shape of the track width defining portion of the pole layer. Japanese Published Patent Application 2003-296906 discloses a technique for suppressing an occurrence of the pole erase phenomenon by improving the shape of the track width defining portion of a single pole head. For example, this publication discloses that the distance from the medium facing surface to the boundary between the track width defining portion and the wide portion, this distance being hereinafter called a neck height, is divided by the area of the end face of the track width defining portion taken in the medium facing surface, and a value thereby obtained is made greater than zero and smaller than 0.002 ($nm^{-1}$).

On the other hand, for the shield-type heads, it has been found out that it is impossible to sufficiently suppress an occurrence of the pole erase phenomenon only by controlling the neck height and the area of the end face of the track width defining portion taken in the medium facing surface. This is assumed to relate to the fact that the shield-type heads are different from the single-pole heads in that the shield layer is located near the pole layer in a neighborhood of the medium facing surface.

Japanese Published Patent Application 2004-295987 discloses a technique for ensuring write characteristics by satisfying conditions of $NH \leqq W1 + 0.05$ μm and $0.5 < NH/TH < 1.6$, where TH (μm) is the distance from the medium facing surface to the point at which the space between the pole layer and the shield layer starts to be greater than the space between the pole layer and the shield layer taken in the medium facing surface (the distance being hereinafter called a throat height), W1 (μm) is the track width, and NH (μm) is the neck height.

As previously described, if the track width is reduced to achieve higher recording density, it is required to further reduce the neck height NH and the throat height TH for preventing degradation in write characteristics. However, if the throat height TH is made too small, saturation of magnetic flux occurs in a portion of the shield layer from the medium facing surface to the point at which the space between the pole layer and the shield layer starts to be greater than the space between the pole layer and the shield layer taken in the medium facing surface. As a result, the function of the shield layer is degraded, which results in an increase in magnetic flux that is generated from the end face of the pole layer located in the medium facing surface and that extends in directions other than the direction orthogonal to the surface of the recording medium. Therefore, it is not favorable to make the throat height TH too small for achieving higher recording density.

OBJECT AND SUMMARY OF THE INVENTION

It is an object of the invention to provide a magnetic head for perpendicular magnetic recording that is capable of improving recording density and suppressing an occurrence of pole erase phenomenon, and to provide a head gimbal assembly, a head arm assembly, and a magnetic disk drive each of which incorporates the magnetic head for perpendicular magnetic recording.

A magnetic head for perpendicular magnetic recording of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium by means of a perpendicular magnetic recording system; a shield layer having an end face located in the medium facing surface and having a portion that is located away from the medium facing surface and coupled to the pole layer; and a gap layer made of a nonmagnetic material and provided between the pole layer and the shield layer.

In the magnetic head for perpendicular magnetic recording of the invention, in the medium facing surface, the end face of the shield layer is located forward of the end face of the pole layer along the direction of travel of the recording medium with a specific space. The pole layer incorporates: a track width defining portion that has an end located in the medium facing surface and that defines the track width; and a wide portion coupled to the other end of the track width defining portion and having a width greater than the width of the track width defining portion. The value of NH×TH/WG is greater than zero and smaller than or equal to 0.85 μm, where NH is the distance from the medium facing surface to the boundary between the track width defining portion and the wide portion, TH is the distance from the medium facing surface to the point at which the space between the pole layer and the shield layer starts to be greater than the space between the pole layer and the shield layer taken in the medium facing surface, and WG is the space between the pole layer and the shield layer taken in the medium facing surface.

According to the magnetic head of the invention, the magnetic head comprises the shield layer and the value of NH×TH/WG is greater than zero and smaller than or equal to 0.85 μm. As a result, it is possible to improve recording density and to suppress an occurrence of pole erase phenomenon.

According to the magnetic head of the invention, the value of WG is preferably greater than zero and smaller than or equal to 200 nm.

According to the magnetic head of the invention, the value of NH/TH may be greater than zero and smaller than or equal to 0.5.

A head gimbal assembly of the invention comprises: a slider including the magnetic head for perpendicular magnetic recording of the invention and disposed to face toward a recording medium; and a suspension flexibly supporting the slider.

A head arm assembly of the invention comprises: a slider including the magnetic head for perpendicular magnetic recording of the invention and disposed to face toward a recording medium; a suspension flexibly supporting the slider; and an arm for making the slider travel across tracks of the recording medium, the suspension being attached to the arm.

A magnetic disk drive of the invention comprises: a slider including the magnetic head for perpendicular magnetic recording of the invention and disposed to face toward a circular-plate-shaped recording medium that is driven to be rotated; and an alignment device supporting the slider and aligning the slider with respect to the recording medium.

According to the invention, in the magnetic head for perpendicular magnetic recording that comprises the shield layer, the value of NH×TH/WG is greater than zero and smaller than or equal to 0.85 μm. As a result, it is possible to improve recording density and to suppress an occurrence of pole erase phenomenon.

Other and further objects, features and advantages of the invention will appear more fully from the following description.

DETAILED DESCRIPTION OF THE PREFERRED EMBODIMENT

Figure 1:
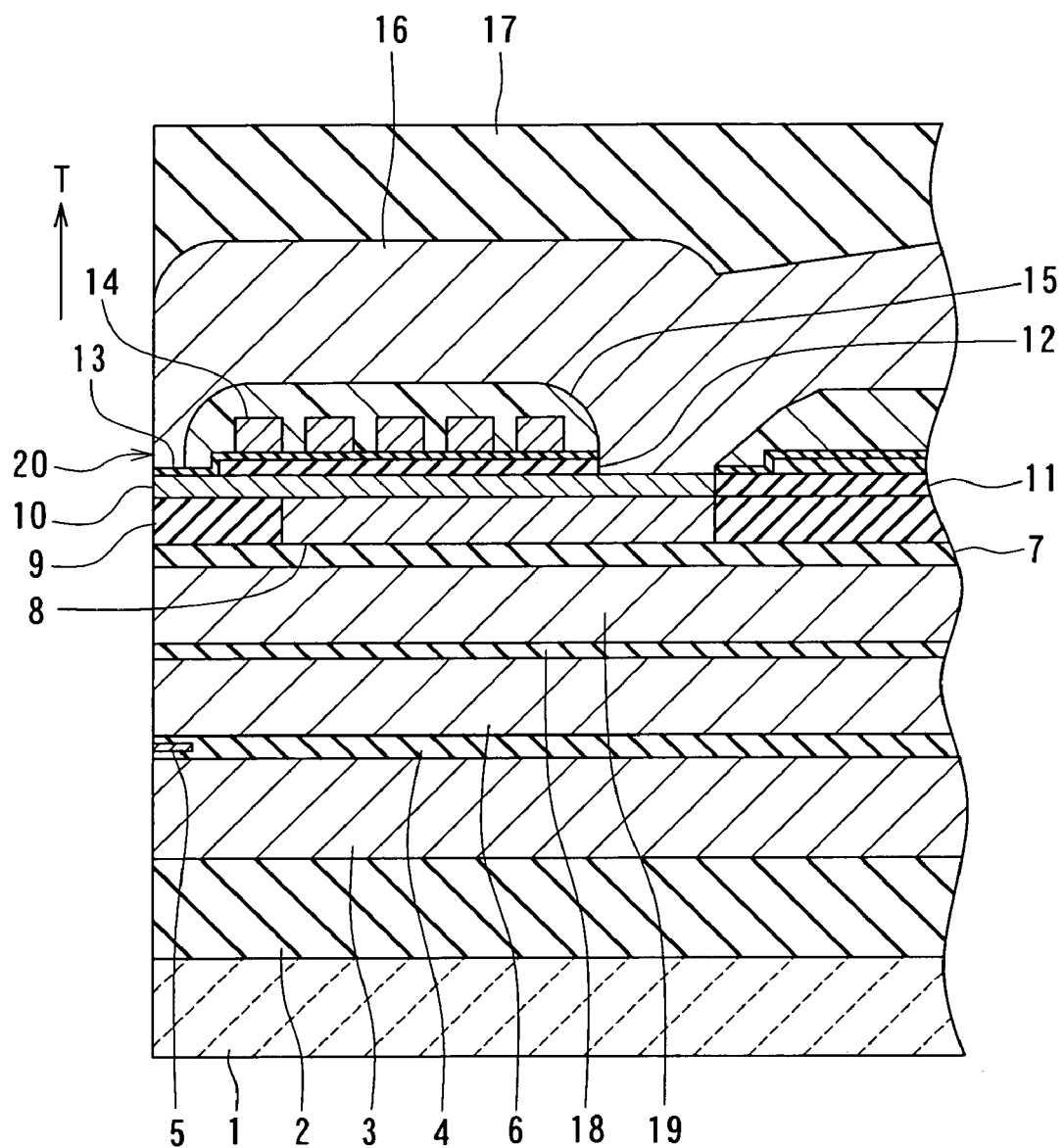
FIG. 1 is a cross-sectional view for illustrating the configuration of a magnetic head for perpendicular magnetic recording of an embodiment of the invention.
Figure 2:
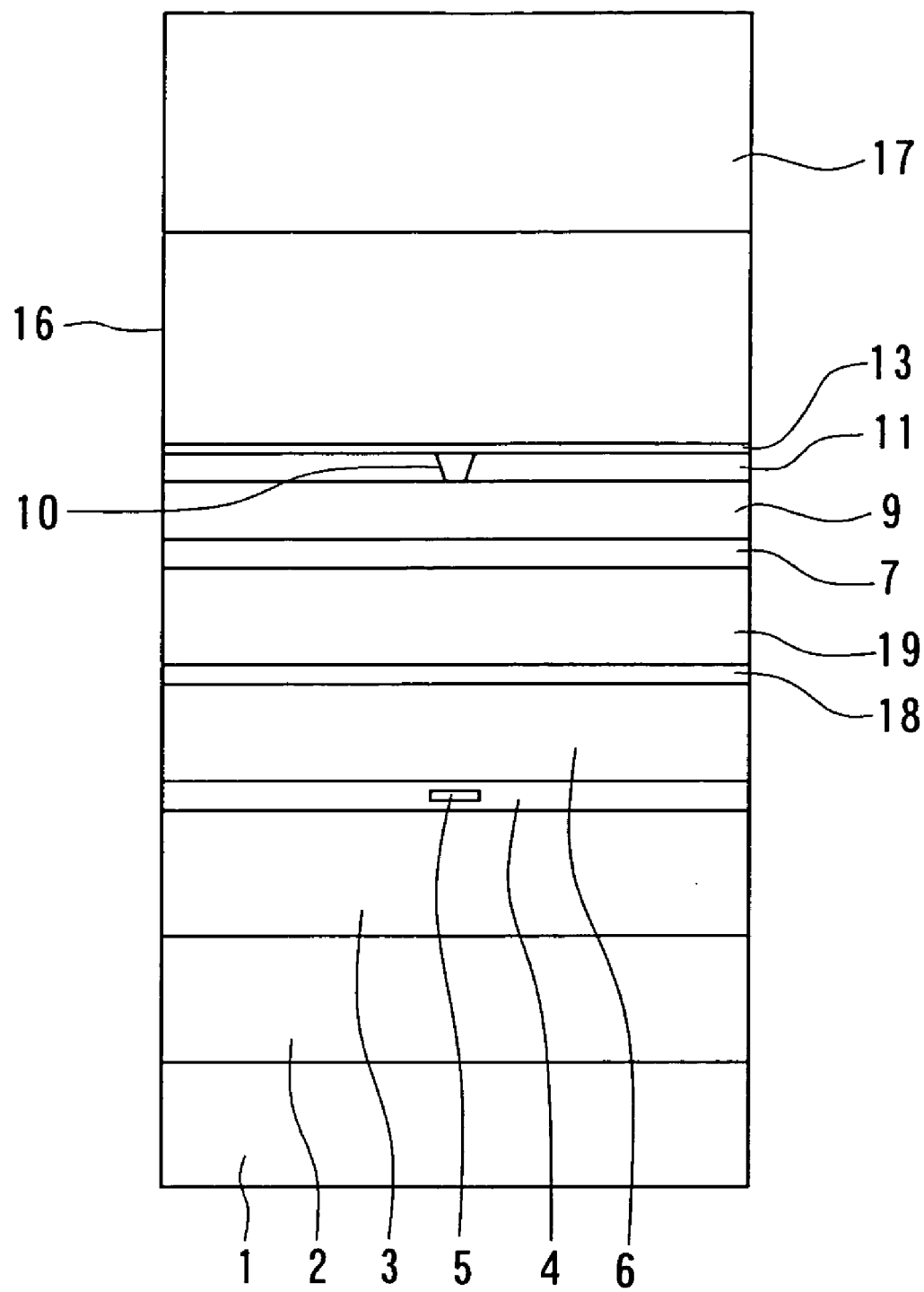
FIG. 2 is a front view of the medium facing surface of the magnetic head of FIG. 1.

A preferred embodiment of the invention will now be described in detail with reference to the accompanying drawings. Reference is now made to FIG. 1 and FIG. 2 to describe the configuration of a magnetic head for perpendicular magnetic recording of the embodiment of the invention. FIG. 1 is a cross-sectional view illustrating the configuration of the magnetic head of the embodiment. FIG. 1 illustrates a cross section orthogonal to the medium facing surface and a surface of a substrate. The arrow indicated with T in FIG. 1 shows the direction of travel of a recording medium. FIG. 2 is a front view illustrating the medium facing surface of the magnetic head of the embodiment.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and formed on the insulating layer 2; a magnetoresistive (MR) element 5 as a read element formed over the bottom shield layer 3 with an insulating layer 4 disposed between the MR element 5 and the bottom shield layer 3; and a top shield layer 6 made of a magnetic material and formed over the MR element 5 with the insulating layer 4 disposed between the MR element 5 and the top shield layer 6.

The MR element 5 has an end that is located in a medium facing surface (an air bearing surface) 20 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. GMR elements include a current-in-plane (CIP) type wherein a current used for detecting magnetic signals (that is hereinafter called a sense current) is fed in the direction parallel to the plane of each layer making up the GMR element, and a current-perpendicular-to-plane (CPP) type wherein a sense current is fed in the direction perpendicular to the plane of each layer making up the GMR element.

The magnetic head further comprises: a nonmagnetic layer 18 made of a nonmagnetic material such as alumina and formed on the top shield layer 6; a magnetic layer 19 made of a magnetic material and formed on the nonmagnetic layer 18; a nonmagnetic layer 7 made of a nonmagnetic material such as alumina and formed on the magnetic layer 19; a yoke layer 8 made of a magnetic material and formed on the nonmagnetic layer 7; and a nonmagnetic layer 9 made of a nonconductive and nonmagnetic material such as alumina and disposed around the yoke layer 8. An end of the yoke layer 8 closer to the medium facing surface 20 is located at a distance from the medium facing surface 20. The yoke layer 8 and the nonmagnetic layer 9 have flattened top surfaces.

The magnetic head further comprises: a pole layer 10 made of a magnetic material and disposed on the top surfaces of the yoke layer 8 and the nonmagnetic layer 9; and a nonmagnetic layer 11 made of a nonconductive and nonmagnetic material such as alumina and disposed around the pole layer 10. A bottom surface of the pole layer 10 touches the top surface of the yoke layer 8. The pole layer 10 and the nonmagnetic layer 11 have flattened top surfaces.

The magnetic head further comprises: a nonmagnetic layer 12 made of a nonconductive and nonmagnetic material such as alumina and formed on regions of the pole layer 10 and the nonmagnetic layer 11 where a thin-film coil 14 described later will be disposed; a gap layer 13 made of a nonmagnetic material such as alumina and formed to cover the nonmagnetic layer 12; the thin-film coil 14 disposed on the gap layer 13 and above the nonmagnetic layer 12; and an insulating layer 15 formed to cover the thin-film coil 14. The coil 14 is flat-whorl-shaped. The gap layer 13 has an opening located in a region corresponding to the center of the coil 14. The insulating layer 15 is not exposed from the medium facing surface 20. The gap layer 13 may be designed such that it is not disposed below the thin-film coil 14. In this case, the gap layer 13 may be a nonmagnetic conductive layer.

The magnetic head further comprises: a write shield layer 16 made of a magnetic material and formed on the pole layer 10, the gap layer 13 and the insulating layer 15; and a protection layer 17 formed to cover the write shield layer 16. The write shield layer 16 is coupled to the pole layer 10 through the opening of the gap layer 13. An end face of the write shield layer 16 closer to the medium facing surface 20 is located in the medium facing surface 20. The write shield layer 16 corresponds to the shield layer of the invention.

The magnetic head of the embodiment comprises the medium facing surface 20 that faces toward a recording medium, as described so far, and a read head and a write head. The read head is disposed backward along the direction T of travel of the recording medium (that is, closer to the air inflow end of the slider). The write head is disposed forward along the direction T of travel of the recording medium (that is, closer to the air outflow end of the slider). The magnetic head writes data on the recording medium through the use of the write head and reads data stored on the medium through the use of the read head.

The read head comprises the MR element 5 as the read element, and the bottom shield layer 3 and the top shield layer 6 for shielding the MR element 5. Portions of the bottom shield layer 3 and the top shield layer 6 that are located on a side of the medium facing surface 20 are opposed to each other, the MR element 5 being placed between these portions. The read head further comprises the insulating layer 4 disposed between the MR element 5 and the bottom shield layer 3 and between the MR element 5 and the top shield layer 6.

The write head comprises the yoke layer 8, the pole layer 10, the gap layer 13, the thin-film coil 14, and the write shield layer 16. The thin-film coil 14 generates a magnetic field corresponding to data to be written on the recording medium. The pole layer 10 has an end face located in the medium facing surface 20. The pole layer 10 allows a magnetic flux corresponding to the field generated by the coil 14 to pass therethrough and generates a write magnetic field for writing data on the medium by means of the perpendicular magnetic recording system. As shown in FIG. 2, the end face of the pole layer 10 located in the medium facing surface 20 has a shape of trapezoid whose side closer to the gap layer 13 is longer than the opposite side. It is thereby possible to suppress a phenomenon in which, when data is written on a specific track, data stored on an adjacent track is erased because of a skew. The skew is a tilt of the magnetic head with respect to the tangent of the circular track of a circular-plate-shaped recording medium.

The write shield layer 16 has an end face located in the medium facing surface 20. In the medium facing surface 20, the end face of the write shield layer 16 is disposed forward of the end face of the pole layer 10 along the direction T of travel of the recording medium (that is, disposed closer to the air outflow end of the slider) with a specific space created by the thickness of the gap layer 13. A portion of the write shield layer 16 located away from the medium facing surface 20 is magnetically coupled to the pole layer 10. The gap layer 13 is made of a nonmagnetic material and provided between the pole layer 10 and the write shield layer 16. At least a portion of the thin-film coil 14 is disposed between the pole layer 10 and the write shield layer 16 and insulated from the pole layer 10 and the write shield layer 16.

A variety of modifications of the magnetic head of the embodiment are possible, as will now be described. First, it is not absolutely necessary to provide the yoke layer 8. Alternatively, the yoke layer 8 may be provided above the pole layer 10 or may be provided above and below the pole layer 10, respectively. Furthermore, in addition to the flat-whorl-shaped coil 14 of FIG. 1, another flat-whorl-shaped coil may be provided between the magnetic layer 19 and the pole layer 10 and insulated from the magnetic layer 19 and the pole layer 10. In this case, the magnetic layer 19 and the pole layer 10 may be connected to each other but it is not absolutely necessary that they are connected to each other. In place of the coil 14, a coil wound around the pole layer 10 in a helical manner may be provided. The write shield layer 16 may be made up of a single layer or a plurality of layers. The end face of the pole layer 10 located in the medium facing surface 20 may be rectangle-shaped.

Figure 3:
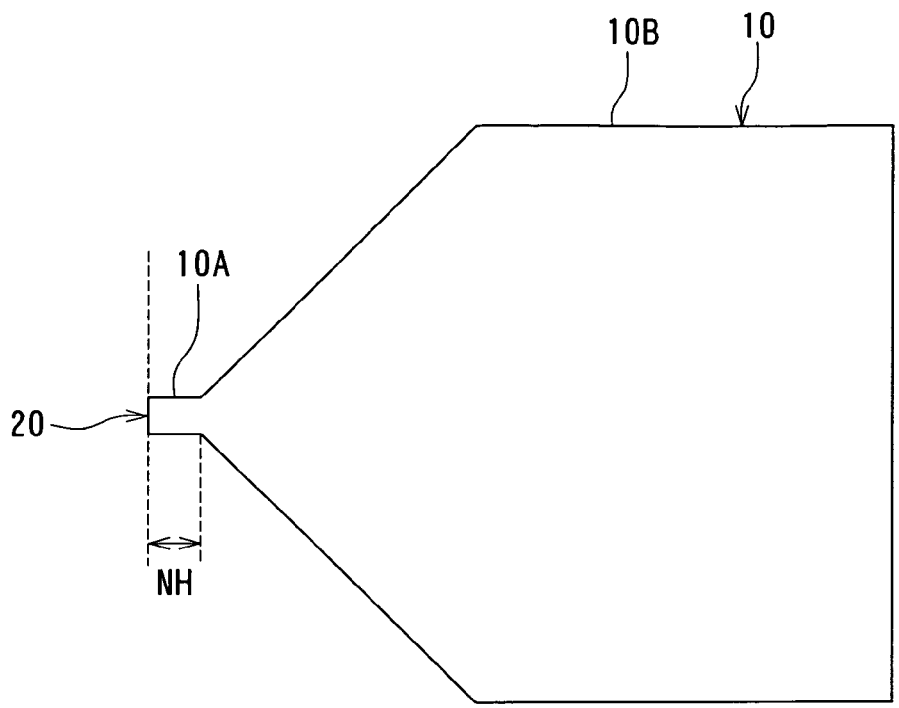
FIG. 3 is a top view of the pole layer of the magnetic head of FIG. 1.

Reference is now made to FIG. 3 to describe the shape of the pole layer 10 in detail. FIG. 3 is a top view of the pole layer 10. As shown in FIG. 3, the pole layer 10 incorporates a track width defining portion 10A and a wide portion 10B. The track width defining portion 10A has an end located in the medium facing surface 20. The wide portion 10B is coupled to the other end of the track width defining portion 10A and has a width greater than the width of the track width defining portion 10A. The top surface of the track width defining portion 10A has a nearly uniform width. The width of the top surface of the track width defining portion 10A taken in the medium facing surface 20 defines the track width. For example, the wide portion 10B is equal in width to the track width defining portion 10A at the interface with the track width defining portion 10A, and gradually increases in width as the distance from the medium facing surface 20 increases and then maintains a specific width to the end of the wide portion 10B. Here, the distance from the medium facing surface 20 to the boundary between the track width defining portion 10A and the wide portion 10B is called a neck height and indicated with NH.

Figure 4:
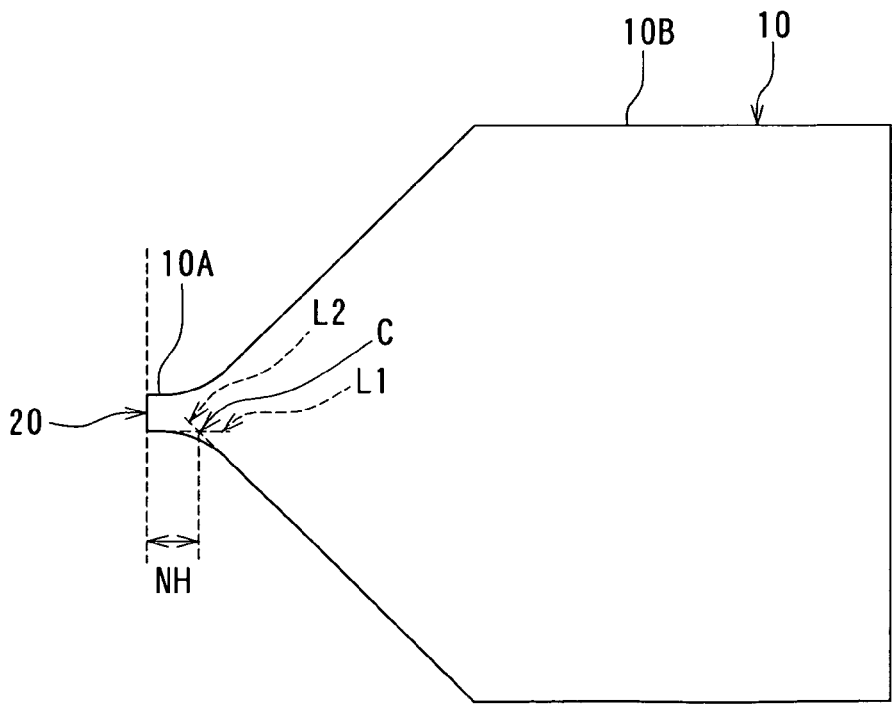
FIG. 4 is a view for illustrating a method of defining the neck height in the pole layer having a shape out of the shape as designed.

There may be a case in which, although the shape of the pole layer 10 as designed is the one illustrated in FIG. 3, the pole layer 10 actually formed is out of the shape as designed, as shown in FIG. 4. In the example of FIG. 4, the track width defining portion 10A has such a shape that the width varies in accordance with the position along the direction orthogonal to the medium facing surface 20. In this case, the location of the boundary between the track width defining portion 10A and the wide portion 10B is made unclear, and the neck height NH is thereby made unclear, too. Then, in such a case, the neck height NH and the location of the boundary between the track width defining portion 10A and the wide portion 10B are defined as will now be described. In the top surface of the pole layer 10, an imaginary straight line L1 passes through the intersection point of the medium facing surface 20 and the side portion of the track width defining portion 10A, and extends in the direction orthogonal to the medium facing surface 20. An imaginary straight line L2 extends from a straight line portion of the side portion of the wide portion 10B contiguous to the side portion of the portion 10A and extends in the direction in which the straight line portion extends. The intersection point of the imaginary straight lines L1 and L2 is defined as C. The location of the point C is defined as the location of the boundary between the track width defining portion 10A and the wide portion 10B. The distance between the medium facing surface 20 and the point C is defined as the neck height NH. The neck height NH as thus defined is nearly equal to the neck height NH as designed.

Figure 5:
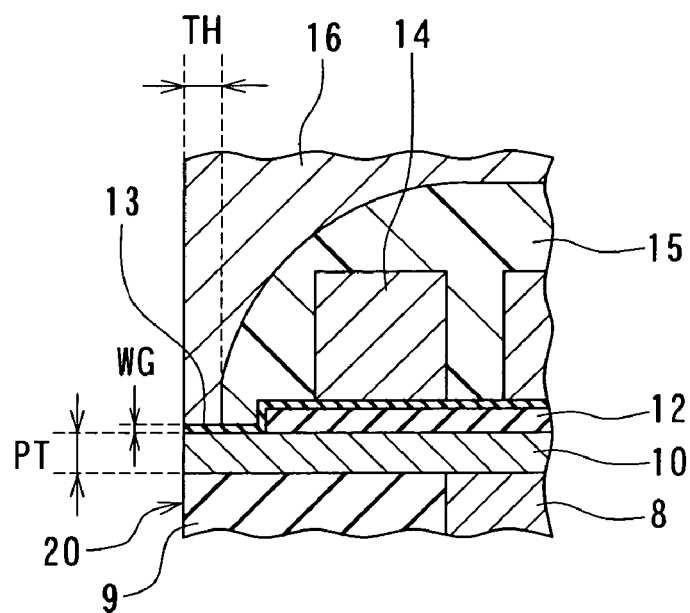
FIG. 5 is a cross-sectional view for illustrating the pole layer, the gap layer and the write shield layer near the medium facing surface of the magnetic head of FIG. 1.

Reference is now made to FIG. 5 to describe the positional relationship among the pole layer 10, the gap layer 13 and the write shield layer 16. FIG. 5 is a cross-sectional view for illustrating the pole layer 10, the gap layer 13 and the write shield layer 16 near the medium facing surface 20. As shown in FIG. 5, a portion of the write shield layer 16 located in a region from the medium facing surface 20 to an end of the insulating layer 15 closer to the medium facing surface 20 faces toward the pole layer 10 with the gap layer 13 disposed in between. Here, the space between the pole layer 10 and the write shield layer 16 taken in the medium facing surface 20 is called a gap thickness and indicated with WG. A portion of the write shield layer 16 located on the insulating layer 15 is kept away from the pole layer 10 with a space greater than the gap thickness WG. Here, the distance from the medium facing surface 20 to a point at which the space between the pole layer 10 and the write shield layer 16 starts to be greater than the gap thickness WG is called a throat height and indicated with TH. The thickness of the pole layer 10 taken in the medium facing surface 20 is indicated with PT.

Figure 6:
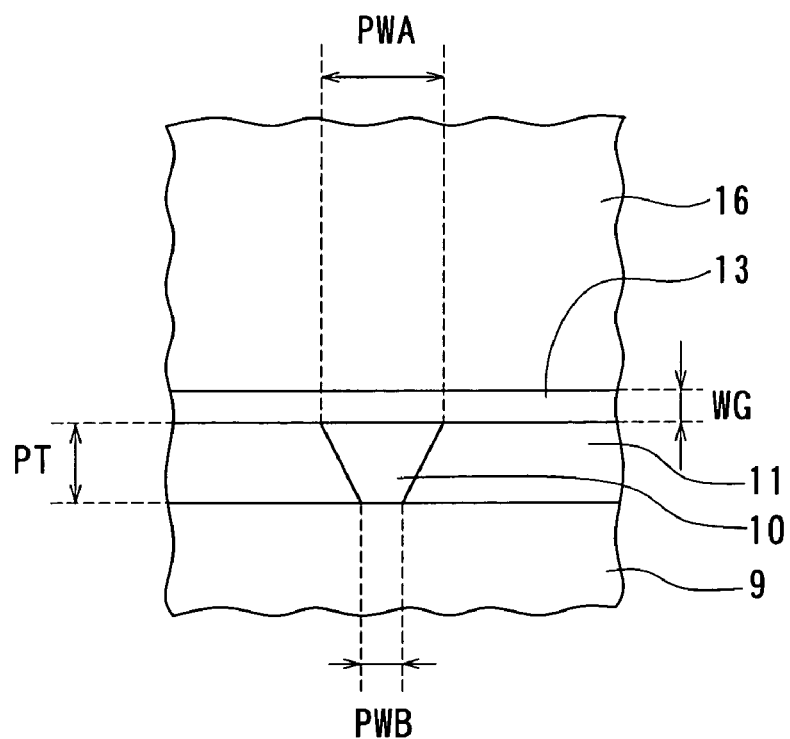
FIG. 6 is a front view illustrating the end face of the pole layer located in the medium facing surface of the magnetic head of FIG. 1.

Reference is now made to FIG. 6 to describe the shape of the end face of the pole layer 10 located in the medium facing surface 20. FIG. 6 is a front view illustrating the end face of the pole layer 10 located in the medium facing surface 20. As shown in FIG. 6, the shape of the end face of the pole layer 10 located in the medium facing surface 20 is a trapezoid in which the side closer to the gap layer 13 is longer than the opposite side. Here, in the end face of the pole layer 10 located in the medium facing surface 20, the length of the side closer to the gap layer 13 is indicated with PWA, and the length of the side farther from the gap layer 13 is indicated with PWB. The length PWA is equal to the track width.

In the embodiment, to achieve higher recording density, the neck height NH is preferably greater than zero and smaller than or equal to 0.3 μm, and more preferably falls within a range of 0.03 to 0.2 μm inclusive.

Similarly, the throat height TH is preferably greater than zero and smaller than or equal to 0.5 μm, and more preferably falls within a range of 0.05 to 0.4 μm inclusive.

To make the most of the above-mentioned function of the write shield layer 16, it is preferred that the gap thickness WG be greater than zero and smaller than or equal to 200 nm, and more preferably fall within a range of 20 to 80 nm inclusive.

The thickness PT of the pole layer 10 taken in the medium facing surface 20 is greater than zero and smaller than or equal to 0.5 μm, for example. The length PWA is greater than zero and smaller than or equal to 0.4 μm, for example. In the end face of the pole layer 10 located in the medium facing surface 20, the side touching the nonmagnetic layer 11 forms an angle that falls within a range of 0 to 20 degrees inclusive, for example, with respect to the direction orthogonal to the top surface of the substrate 1.

If the track width is reduced to achieve higher recording density, it is required to further reduce the neck height NH and the throat height TH to prevent degradation in write characteristics. However, if the throat height TH is made too small, saturation of magnetic flux occurs in a portion of the write shield layer 16 from the medium facing surface 20 to the point at which the space between the pole layer 10 and the write shield layer 16 starts to be greater than the gap thickness WG. As a result, the function of the write shield layer 16 is degraded, which results in an increase in magnetic flux that is generated from the end face of the pole layer 10 located in the medium facing surface 20 and that extends in directions other than the direction orthogonal to the surface of the recording medium. Therefore, it is not favorable to make the throat height TH too small for achieving higher recording density. Consequently, it is preferred to make the neck height NH smaller than the throat height TH for achieving higher recording density. To be specific, it is preferred that the value of NH/TH be greater than zero and smaller than or equal to 0.5.

In the embodiment, the value of NH×TH/WG is greater than zero and smaller than or equal to 0.85 μm. It is thereby possible to improve recording density and to suppress an occurrence of the pole erase phenomenon. This feature will now be described in detail, referring to results of an experiment.

In the experiment, eight samples of magnetic heads whose combinations of the values of NH, TH, WG, PWA, PWB and PT were different were fabricated. The values of those samples are listed in the table below.

TABLE 1

| Sample | NH (μm) | TH (μm) | WG (μm) | PWA (μm) | PWB (μm) | PT (μm) |
|---|---|---|---|---|---|---|
| 1 | 0.130 | 0.182 | 0.049 | 0.185 | 0.1394 | 0.243 |
| 2 | 0.130 | 0.311 | 0.052 | 0.179 | 0.1325 | 0.238 |
| 3 | 0.165 | 0.164 | 0.051 | 0.167 | 0.1190 | 0.239 |
| 4 | 0.174 | 0.323 | 0.051 | 0.161 | 0.1138 | 0.233 |
| 5 | 0.107 | 0.162 | 0.026 | 0.197 | 0.1319 | 0.279 |
| 6 | 0.079 | 0.307 | 0.027 | 0.202 | 0.1413 | 0.267 |
| 7 | 0.136 | 0.184 | 0.027 | 0.187 | 0.1290 | 0.268 |
| 8 | 0.143 | 0.298 | 0.029 | 0.174 | 0.1180 | 0.264 |

Next, an indicator 'PEpass' that indicates the degree of difficulty in occurrence of the pole erase phenomenon was obtained for each of the above-listed samples 1 to 8. The value of the indicator PEpass was obtained through a method that will now be described. In the method, first, each track of a recording medium was divided into 70 sectors. In each of the sectors of the track, writing of a first signal of 130 kFCI (where FCI is the number of flux inversions per one inch) was performed once. Next, the first signal was read from each of the tracks on which the first signals were written, and a mean value of read outputs of the first signals was obtained. The value thus obtained is called an initial output. Next, writing of a second signal of 50 kFCI was performed 300 times at the head portion of each of the sectors in which the first signals were written. Next, the first signal was read from a portion of each of the sectors in which the first and second signals were written, the portion being other than the head portion in which the second signal was written, and a mean value of read outputs of the first signals was obtained. The value thus obtained is called a residual output. The ratio of the residual output to the initial output expressed in percent was defined as the value of the indicator PEpass. In the foregoing processing, data was erased through the use of direct current erasing and alternating current erasing in regions each having a width of 30 μm on both sides of each of the tracks on which the first and second signals were written.

For a magnetic head in which no pole erase phenomenon occurs, the value of the indicator PEpass is nearly 100%. For a magnetic head in which the pole erase phenomenon occurs, at least part of the first signal written on the portion of each of the sectors other than the head portion is erased due to the residual magnetization of the pole layer 10 after the second signal is written on the head portion of each of the sectors. Consequently, the value of the indicator PEpass is lower if the magnetic head is susceptible to the pole erase phenomenon.

The table below shows, for the samples 1 to 8, the values of the area S ($\mu m^2$) of the end face of the pole layer 10 taken in the medium facing surface 20, NH/S ($\mu m^{-1}$), NH/TH, NH×TH/WG (μm), and the indicator PEpass (%). The area S was obtained by calculation using an expression (PWA+PWB)×PT/2.

TABLE 2

| Sample | S | NH/S | NH/TH | NH × TH/WG | PEpass |
|---|---|---|---|---|---|
| 1 | 0.0394 | 3.30 | 0.714 | 0.483 | 95 |
| 2 | 0.0371 | 3.51 | 0.418 | 0.778 | 100 |
| 3 | 0.0342 | 4.83 | 1.006 | 0.561 | 90 |
| 4 | 0.0320 | 5.44 | 0.539 | 1.102 | 63 |
| 5 | 0.0459 | 2.33 | 0.660 | 0.667 | 89 |
| 6 | 0.0458 | 1.72 | 0.257 | 0.898 | 90 |
| 7 | 0.0423 | 3.21 | 0.739 | 0.927 | 65 |
| 8 | 0.0385 | 3.71 | 0.480 | 1.469 | 20 |

Figure 11:
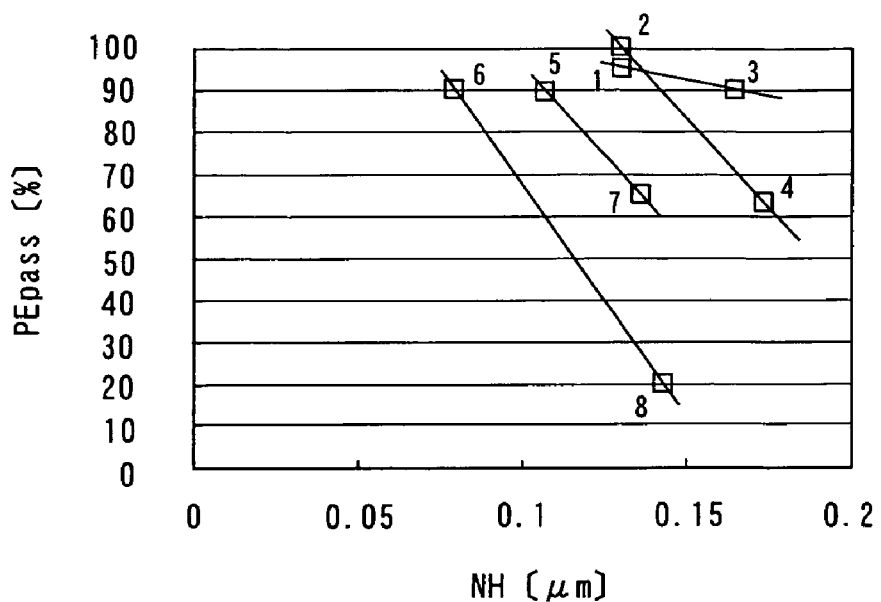
FIG. 11 is a plot showing the relationship between the neck height NH and an indicator 'PEpass' that indicates the degree of difficulty in occurrence of pole erase phenomenon obtained in an experiment.

FIG. 11 shows the relationship between the neck height NH and the indicator PEpass for each of the samples 1 to 8. In FIG. 11, the horizontal axis indicates the neck height NH, and the vertical axis indicates the indicator PEpass. In FIG. 11, the values of the neck height NH and the indicator PEpass for each of the samples are indicated with the coordinates of square marks in the plot. The numeral shown near each square mark indicates the sample number. Here, to examine the relationship between the neck height NH and the indicator PEpass, the values of the indicators PEpass are compared between each pair of the samples having close throat heights TH and gap thicknesses WG. To be specific, such pairs are: the pair of the samples 1 and 3, the pair of the samples 2 and 4, the pair of the samples 5 and 7, and the pair of the samples 6 and 8. In FIG. 11 two square marks corresponding to each of the pairs are connected to each other with a straight line. FIG. 11 indicates that the smaller the neck height NH, the greater is the value of the indicator PEpass.

Figure 12:
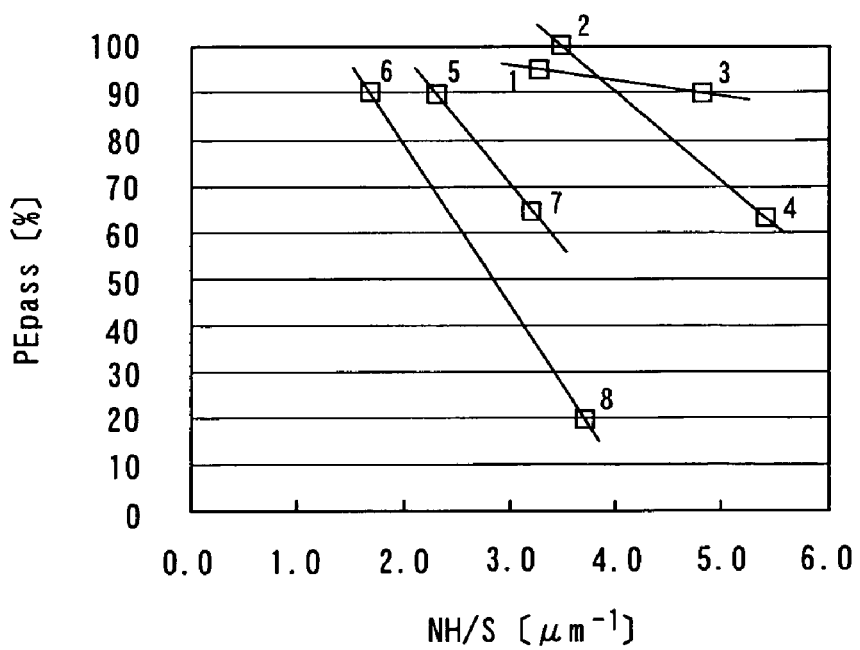
FIG. 12 is a plot showing the relationship between NH/S and the indicator PEpass obtained in the experiment.

FIG. 12 shows the relationship between NH/S and the indicator PEpass for each of the samples 1 to 8. In FIG. 12, the horizontal axis indicates NH/S, and the vertical axis indicates the indicator PEpass. In FIG. 12, the values of NH/S and the indicator PEpass for each of the samples are indicated with the coordinates of square marks in the plot. The numeral shown near each square mark indicates the sample number. Here, to examine the relationship between NH/S and the indicator PEpass, the values of the indicators PEpass are compared between each pair of the samples having close throat heights TH and gap thicknesses WG. To be specific, such pairs are: the pair of the samples 1 and 3, the pair of the samples 2 and 4, the pair of the samples 5 and 7, and the pair of the samples 6 and 8. In FIG. 12 two square marks corresponding to each of the pairs are connected to each other with a straight line. FIG. 12 indicates that the smaller the value of NH/S, the greater is the value of the indicator PEpass.

Figure 13:
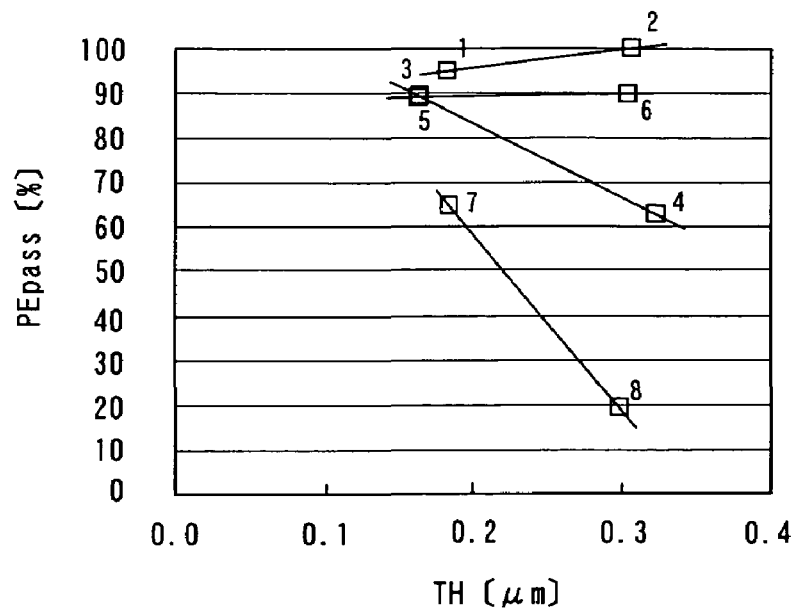
FIG. 13 is a plot showing the relationship between the throat height TH and the indicator PEpass obtained in the experiment.

FIG. 13 shows the relationship between the throat height TH and the indicator PEpass for each of the samples 1 to 8. In FIG. 13, the horizontal axis indicates the throat height TH, and the vertical axis indicates the indicator PEpass. In FIG. 13, the values of the throat height TH and the indicator PEpass for each of the samples are indicated with the coordinates of square marks in the plot. The numeral shown near each square mark indicates the sample number. Here, to examine the relationship between the throat height TH and the indicator PEpass, the values of the indicators PEpass are compared between each pair of the samples having close neck heights NH and gap thicknesses WG. To be specific, such pairs are: the pair of the samples 1 and 2, the pair of the samples 3 and 4, the pair of the samples 5 and 6, and the pair of the samples 7 and 8. In FIG. 13 two square marks corresponding to each of the pairs are connected to each other with a straight line. FIG. 13 indicates that the smaller the throat height TH, the greater is the value of the indicator PEpass. For the pair of the samples 1 and 2 and the pair of the samples 5 and 6, the values of the indicators PEpass are nearly equal although the values of the throat heights TH are different. It is assumed that the reason is that, since the neck height NH of each of the samples 1, 2, 5 and 6 is sufficiently small, the value of the indicator PEpass is sufficiently great.

Figure 14:
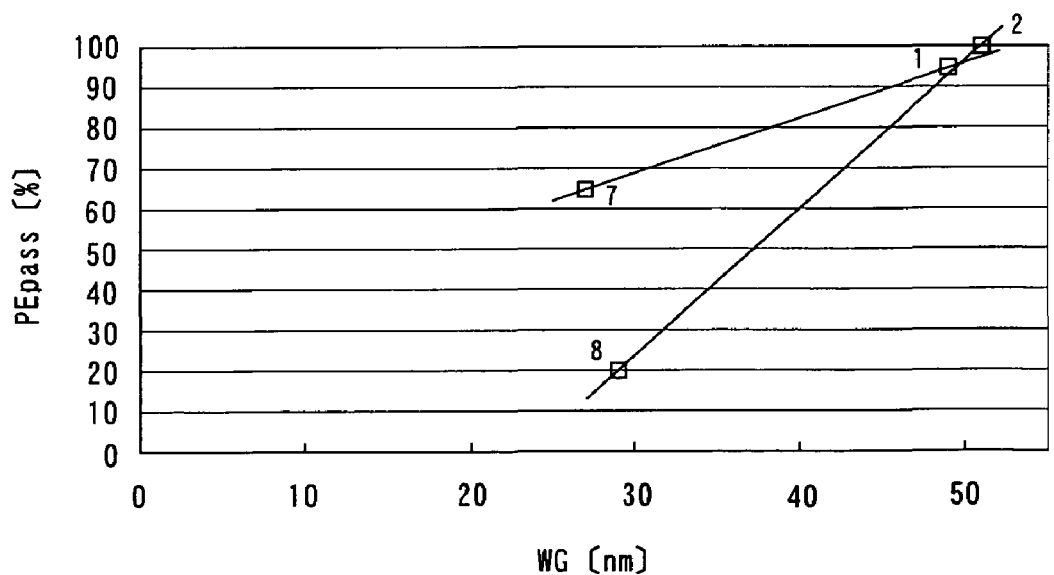
FIG. 14 is a plot showing the relationship between a gap thickness WG and the indicator PEpass obtained in the experiment.

FIG. 14 shows the relationship between the gap thickness WG and the indicator PEpass for each of the samples 1, 2, 7 and 8. In FIG. 14, the horizontal axis indicates the gap thickness WG, and the vertical axis indicates the indicator PEpass. In FIG. 14, the values of the gap thickness WG and the indicator PEpass for each of the samples are indicated with the coordinates of square marks in the plot. The numeral shown near each square mark indicates the sample number. Here, to examine the relationship between the gap thickness WG and the indicator PEpass, the values of the indicators PEpass are compared between each pair of the samples having close neck heights NH and throat heights TH. To be specific, such pairs are: the pair of the samples 1 and 7 and the pair of the samples 2 and 8. In FIG. 14 two square marks corresponding to each of the pairs are connected to each other with a straight line. FIG. 14 indicates that the greater the gap thickness WG, the greater is the value of the indicator PEpass.

As the results shown in FIG. 11 to FIG. 14 indicate, it is assumed that, for the shield-type head, at least the neck height NH, NH/S, the throat height TH and the gap thickness WG relate to the likelihood of an occurrence of the pole erase phenomenon. Consideration will now be given to structural differences between a single-pole head and a shield-type head such as the magnetic head of the embodiment of the invention. A major structural difference between the single-pole head and the shield-type head is that, in the single-pole head, there hardly exists magnetic coupling between the pole layer and the auxiliary pole near the medium facing surface while there is magnetic coupling between the pole layer and the shield layer near the medium facing surface in the shield-type head. In the magnetic head of the embodiment, too, the pole layer 10 and the write shield layer 16 are magnetically coupled to each other in a neighborhood of the medium facing surface 20. Each of the neck height NH, the throat height TH and the gap thickness WG relates to the magnitude of magnetic coupling between the pole layer 10 and the write shield layer 16 in the neighborhood of the medium facing surface 20. That is, the smaller the neck height NH, the smaller is the magnetic coupling. The smaller the throat height TH, the smaller the above-mentioned magnetic coupling. The greater the gap thickness WG, the smaller the magnetic coupling. Furthermore, the results shown in FIG. 11, FIG. 13 and FIG. 14 indicate that, the smaller the magnetic coupling, that is, the smaller the neck height NH and the throat height TH, and the greater the gap thickness WG, the less likely is the pole erase phenomenon to occur. The foregoing factors being considered, it is assumed that, for the shield-type head, it is less likely that the pole erase phenomenon occurs as the magnetic coupling between the pole layer and the shield layer in the neighborhood of the medium facing surface is reduced.

Therefore, in the embodiment, an occurrence of the pole erase phenomenon is suppressed by controlling the magnitude of magnetic coupling between the pole layer and the shield layer in the neighborhood of the medium facing surface in the shield-type head. That is, according to the embodiment, the foregoing consideration indicates that magnetic coupling between the pole layer 10 and the write shield layer 16 in the neighborhood of the medium facing surface 20 is reduced as the value of NH×TH/WG is reduced, and an occurrence of the pole erase phenomenon is thereby suppressed.

Figure 15:
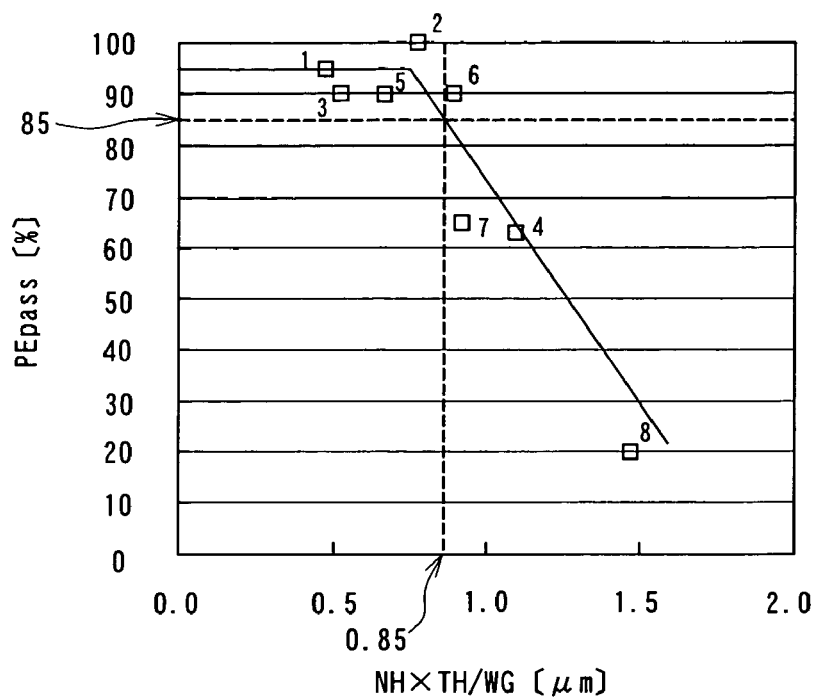
FIG. 15 is a plot showing the relationship between NH×TH/WG and the indicator PEpass obtained in the experiment.

FIG. 15 shows the relationship between the value of NH×TH/WG and the indicator PEpass for each of the samples 1 to 8. In FIG. 15, the horizontal axis indicates the value of NH×TH/WG, and the vertical axis indicates the indicator PEpass. In FIG. 15, the values of NH×TH/WG and the indicator PEpass for each of the samples are indicated with the coordinates of square marks in the plot. The numeral shown near each square indicates the sample number. The straight line in the plot indicates the relationship between the value of NH×TH/WG and the indicator PEpass that is approximated from the square marks in the plot. It is desired for a magnetic disk drive that the value of the indicator PEpass be 85% or greater. As shown in FIG. 15, if the value of NH×TH/WG is greater than zero and smaller than or equal to 0.85 µm, the value of the indicator PEpass is 85% or greater. It is thereby possible to sufficiently suppress an occurrence of the pole erase phenomenon.

The result shown in FIG. 14 indicates that it is preferred that the value of the gap thickness WG be great so as to suppress an occurrence of the pole erase phenomenon. However, if the value of the gap thickness WG is too great, exhibition of the function of the write shield layer 16 is prevented. It is therefore not favorable that the value of the gap thickness WG is too great. A preferred value of the gap thickness WG will now be considered.

The relationship between the gap thickness WG and the function of the write shield layer 16 was examined by simulation. To be specific, as shown in the table below, the write magnetic field intensity and the magnetic field gradient were obtained for each of six samples of magnetic heads having different gap thicknesses WG. Here, the write field intensity indicates the intensity of components orthogonal to the surface of a recording medium among components of the magnetic field measured at a location where the write layer of the recording medium is located when a current of 40 mA is fed to the coil 14. The magnetic field gradient indicates an amount of change [Oe/nm] (1 Oe=79.6 A/m) in the above-mentioned write field intensity per unit length in the direction of travel of the recording medium.

TABLE 3

| WG (nm) | Write field intensity (Oe) | Field gradient (Oe/nm) |
|---|---|---|
| 0 | 0 | |
| 20 | 6450 | 193 |
| 50 | 9561 | 179 |
| 80 | 10728 | 167 |
| 200 | 12135 | 164 |
| 300 | 12140 | 164 |

Figure 16:
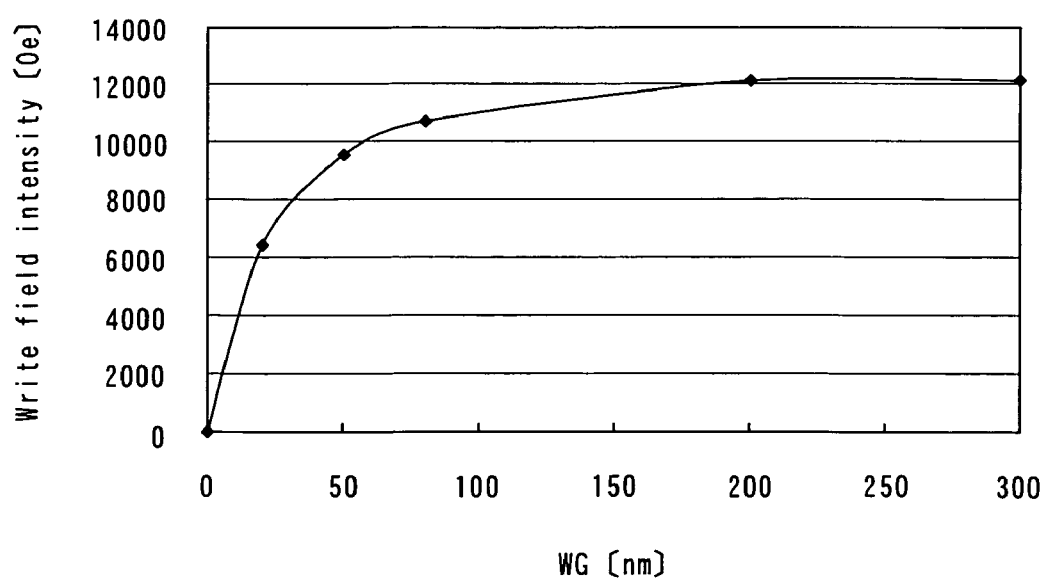
FIG. 16 is a plot showing the relationship between the gap thickness WG and the write field intensity of the magnetic head of the embodiment of the invention.
Figure 17:
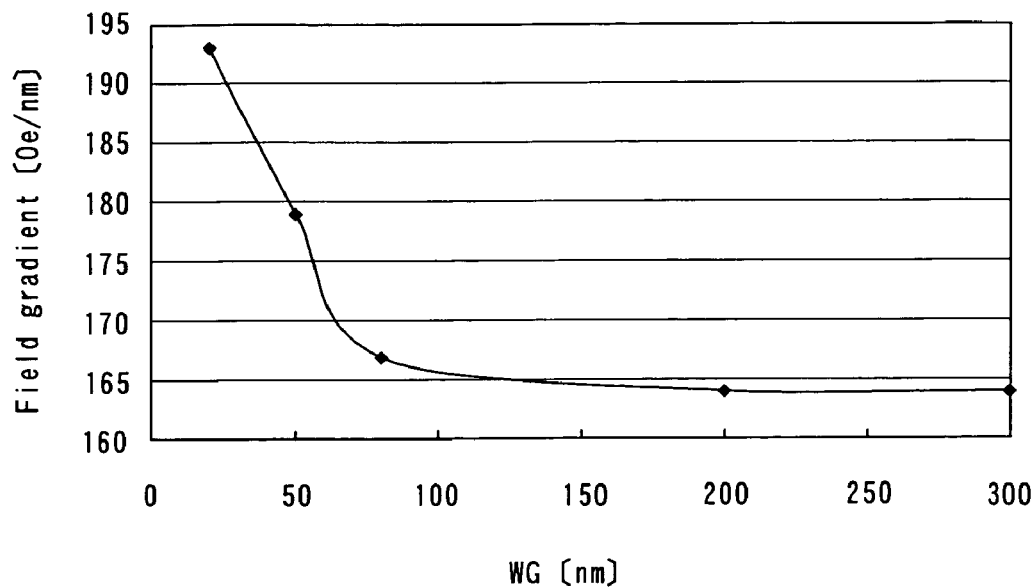
FIG. 17 is a plot showing the relationship between the gap thickness WG and the magnetic field gradient of the magnetic head of the embodiment of the invention.

FIG. 16 shows the relationship between the gap thickness WG and the write field intensity listed in the table above. FIG. 17 shows the relationship between the gap thickness WG and the field gradient listed in the table above. As shown in FIG. 16 and FIG. 17, when the value of the gap thickness WG is greater than 200 nm, the write field intensity and the field gradient hardly change even if the value of the gap thickness WG changes. This suggests that, when the value of the gap thickness WG is greater than 200 nm, there hardly exists magnetic coupling between the pole layer 10 and the write shield layer 16 in the neighborhood of the medium facing surface 20, and the function of the write shield layer 16 will not be exhibited. When the value of the gap thickness WG is greater than zero and smaller than or equal to 200 nm, the write field intensity is smaller but the field gradient is more abrupt, compared with the case in which the value of the gap thickness WG is greater than 200 nm. Therefore, it is assumed that magnetic coupling is created between the pole layer 10 and the write shield layer 16, and the function of the write shield layer 16 is exhibited when the value of the gap thickness WG is greater than zero and smaller than or equal to 200 nm. The foregoing finding indicates that the value of the gap thickness WG is preferably greater than zero and smaller than or equal to 200 nm.

If the value of the gap thickness WG gets close to zero, the write field intensity gets close to zero, too. However, the write field intensity never becomes zero as long as the value of the gap thickness WG is greater than zero. It is therefore sufficient that the value of the gap thickness WG is greater than zero.

Figure 7:
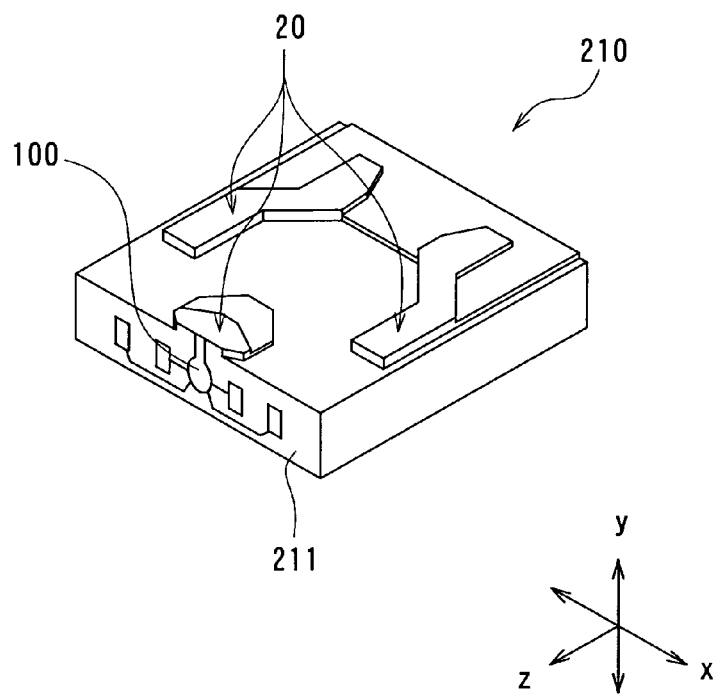
FIG. 7 is a perspective view illustrating a slider that a head gimbal assembly of the embodiment of the invention includes.

A head gimbal assembly, a head arm assembly and a magnetic disk drive of the embodiment will now be described. Reference is made to FIG. 7 to describe a slider 210 incorporated in the head gimbal assembly. In the magnetic disk drive, the slider 210 is placed to face toward a magnetic disk platter that is a circular-plate-shaped recording medium to be driven to be rotated. The slider 210 has a base body 211 made up mainly of the substrate 1 and the protection layer 17 of FIG. 1. The base body 211 is nearly hexahedron-shaped. One of the six surfaces of the base body 211 faces toward the magnetic disk platter. The air bearing surface 20 is formed in this one of the surfaces. When the magnetic disk platter rotates in the z direction of FIG. 7, an airflow passes between the magnetic disk platter and the slider 210, and a lift is thereby generated below the slider 210 in the y direction of FIG. 7 and exerted on the slider 210. The slider 210 flies over the magnetic disk platter by means of the lift. The x direction of FIG. 7 is across the tracks of the magnetic disk platter. A thin-film magnetic head 100 of the embodiment is formed near the air-outflow-side end (the end located at the lower left of FIG. 7) of the slider 210.

Figure 8:
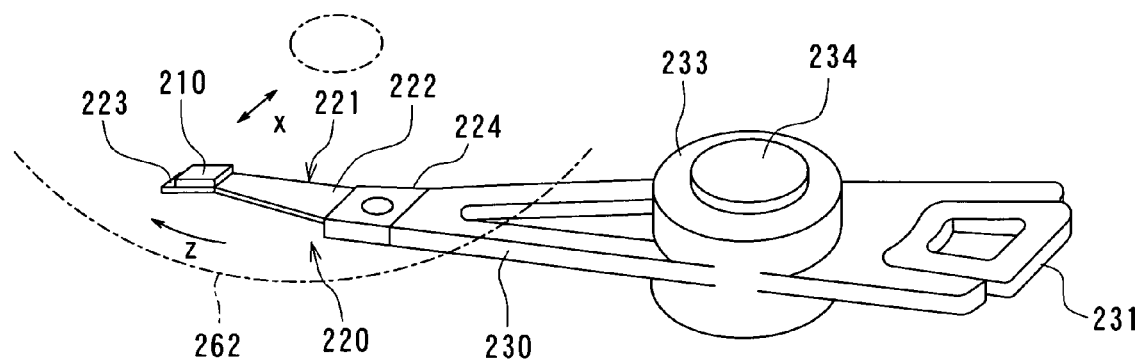
FIG. 8 is a perspective view illustrating a head arm assembly of the embodiment of the invention.

Reference is now made to FIG. 8 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly comprising the arm 230 and the head gimbal assembly 220 attached to the arm 230 is called a head arm assembly. An assembly comprising a carriage having a plurality of arms wherein the head gimbal assembly 220 is attached to each of the arms is called a head stack assembly.

FIG. 8 illustrates the head arm assembly of the embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 9:
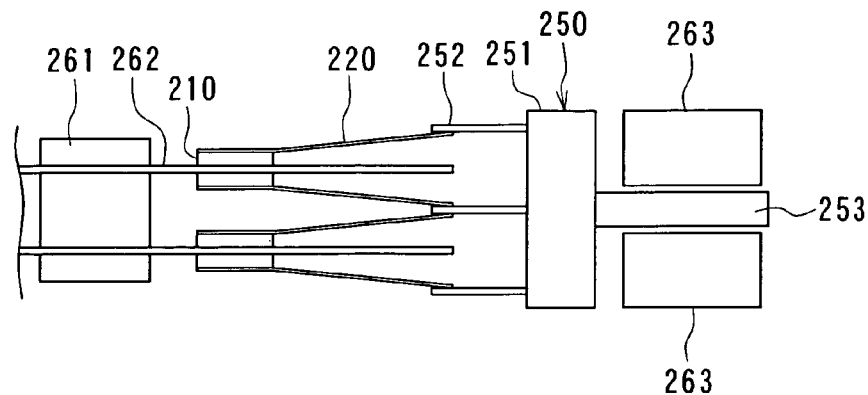
FIG. 9 is a view for illustrating a main part of a magnetic disk drive of the embodiment of the invention.
Figure 10:
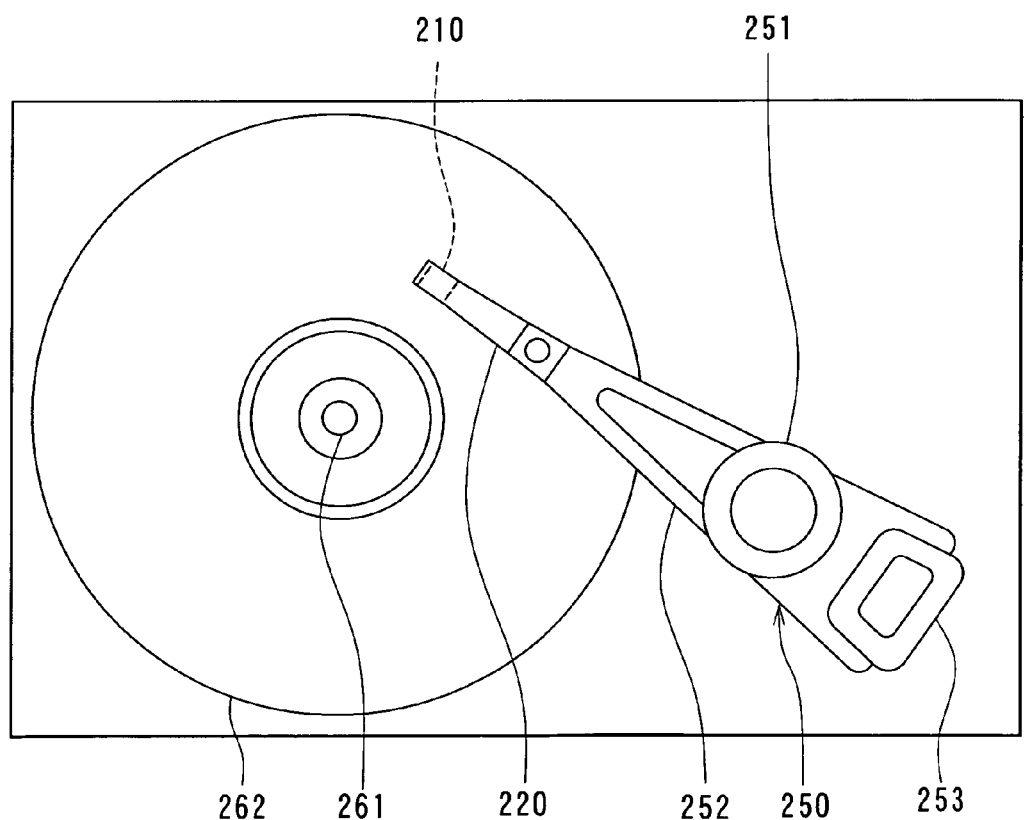
FIG. 10 is a top view of the magnetic disk drive of the embodiment of the invention.

Reference is now made to FIG. 9 and FIG. 10 to describe an example of the head stack assembly and the magnetic disk drive of the embodiment. FIG. 9 illustrates the main part of the magnetic disk drive. FIG. 10 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack-assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 through the use of the write head and reads data stored on the magnetic disk platter 262 through the use of the read head.

The head gimbal assembly, the head arm assembly and the magnetic disk drive of the embodiment exhibit effects similar to those of the foregoing magnetic head of the embodiment.

Reference is now made to FIG. 18 to FIG. 41 to describe details of a reason that it is preferred that the value of NH/TH be greater than zero and smaller than or equal to 0.5 according to the embodiment, referring to the following result of an experiment.

In the experiment, first, various characteristics of five types of samples of magnetic heads having different neck heights NH were obtained to examine the relationship between the neck height NH and the characteristics of the magnetic head. The five types of samples will be hereinafter called samples 11 to 15. The characteristics obtained were: the overwrite property (OW) (dB), the nonlinear transition shift (NLTS) (dB), the signal-to-noise ratio (S/N) (dB), the effective write track width or magnetic write width (MWW) (μm), and the side fringe (SF) (μm). The SF indicates a degree of expansion of magnetic flux that is generated from the end face of the pole layer 10 located in the medium facing surface 20 and that extends in directions other than the direction orthogonal to the surface of the recording medium. Here, the value of MWW−PWA is defined as the SF. For each of the samples 11 to 15, the table below shows the values of NH (μm), TH(μm), NH/TH, PWA (μm), PWB (μm), PT (μm), OW (dB), NLTS (dB), S/N (dB), MWW (μm), and SF (μm). The WG of each of the samples 11 to 15 is 0.04 μm. In the experiment, twenty-five samples were fabricated for each of the types of the magnetic heads. The value listed in the table are mean values of the twenty-five samples.

TABLE 4

| Sample | NH | TH | NH/TH | PWA | PWB | PT | OW | NLTS | S/N | MWW | SF |
|---|---|---|---|---|---|---|---|---|---|---|---|
| 11 | 0.05 | 0.25 | 0.20 | 0.142 | 0.061 | 0.291 | 46.0 | −19.7 | 10.8 | 0.223 | 0.081 |
| 12 | 0.08 | 0.25 | 0.32 | 0.139 | 0.061 | 0.292 | 42.7 | −19.1 | 10.5 | 0.213 | 0.073 |
| 13 | 0.12 | 0.25 | 0.48 | 0.142 | 0.060 | 0.290 | 38.6 | −18.7 | 10.1 | 0.203 | 0.061 |
| 14 | 0.15 | 0.25 | 0.60 | 0.138 | 0.058 | 0.293 | 36.3 | −18.5 | 9.6 | 0.196 | 0.058 |
| 15 | 0.18 | 0.25 | 0.72 | 0.136 | 0.060 | 0.295 | 32.6 | −18.0 | 9.4 | 0.189 | 0.053 |

Figure 18:
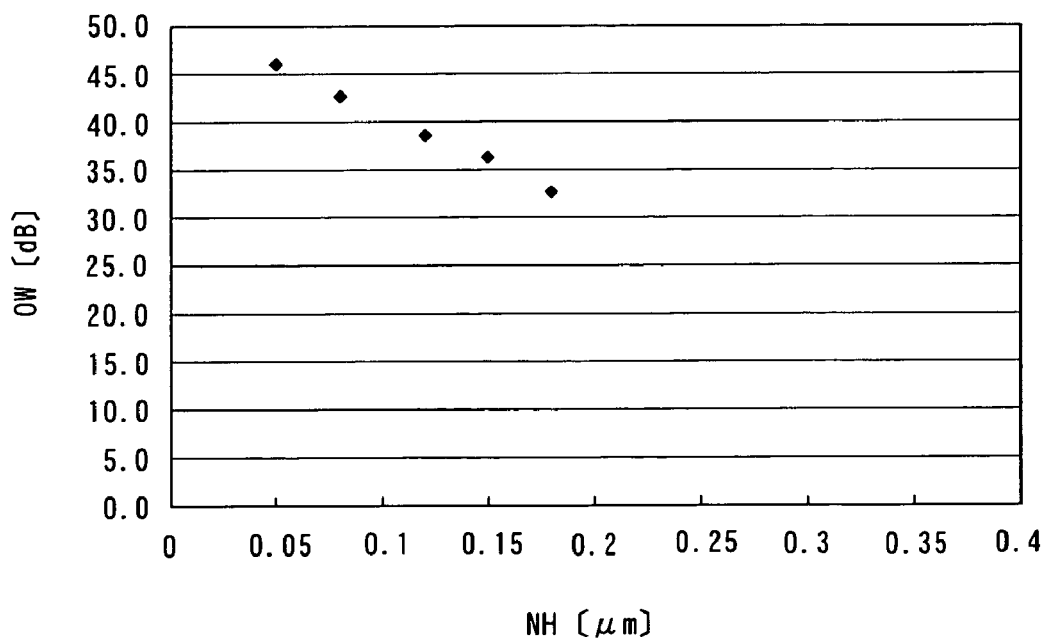
FIG. 18 is a plot showing the relationship between the neck height and the overwrite property obtained in the experiment.
Figure 19:
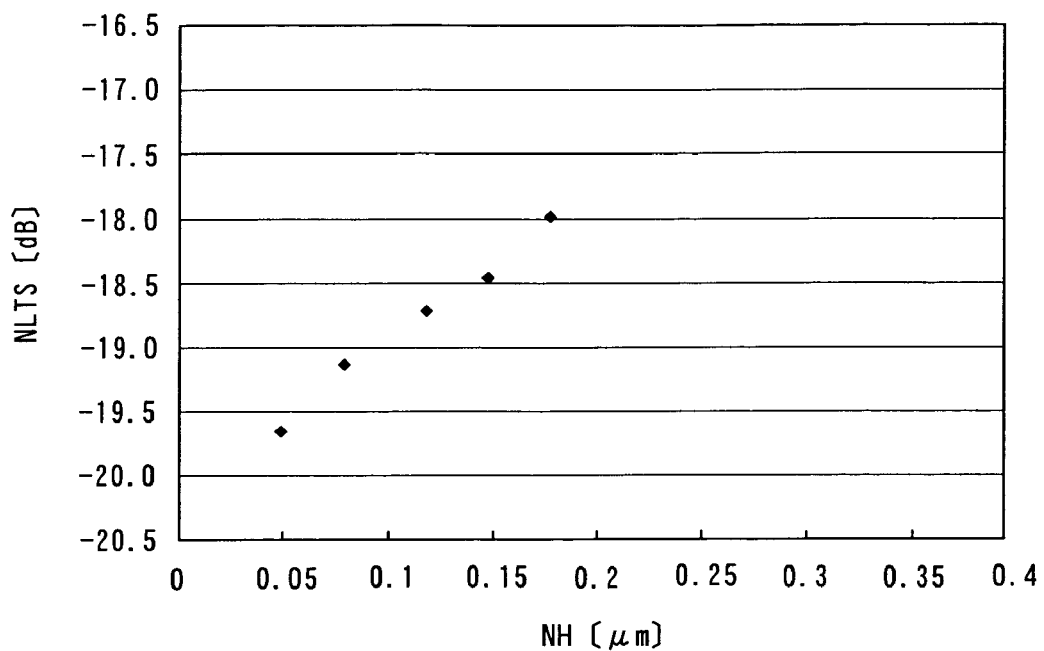
FIG. 19 is a plot showing the relationship between the neck height and the nonlinear transition shift obtained in the experiment.
Figure 20:
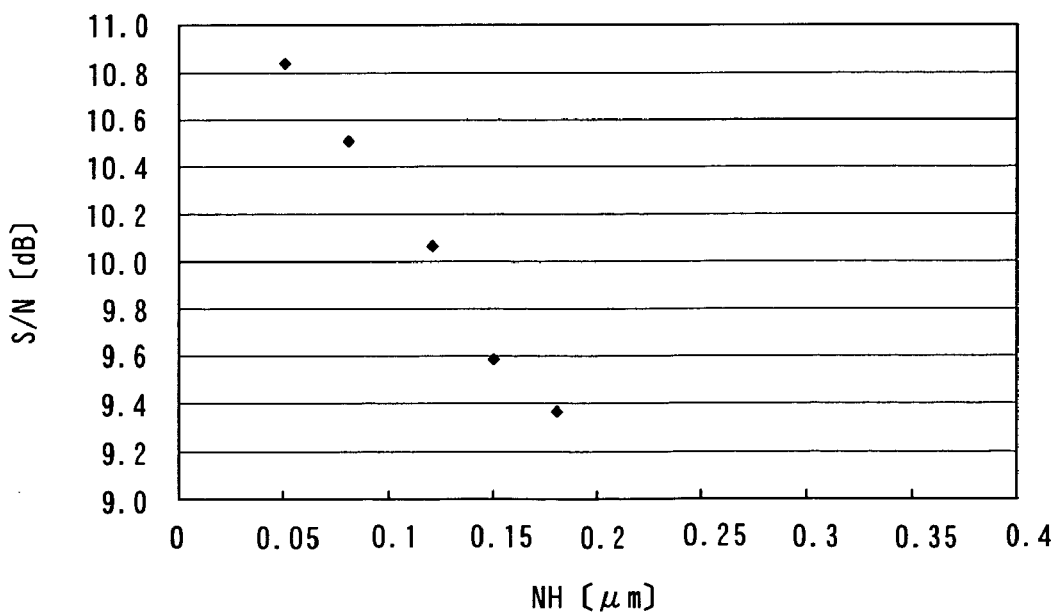
FIG. 20 is a plot showing the relationship between the neck height and the signal-to-noise ratio obtained in the experiment.
Figure 21:
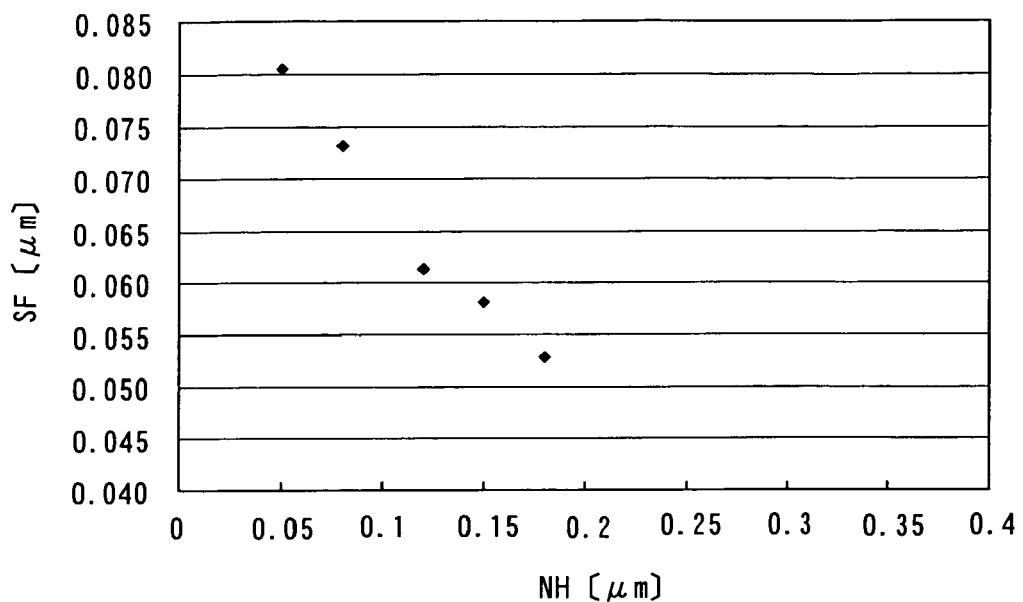
FIG. 21 is a plot showing the relationship between the neck height and the side fringe obtained in the experiment.

FIG. 18 shows the relationship between the neck height NH and the OW of each of the samples 11 to 15. FIG. 19 shows the relationship between the neck height NH and the NLTS of each of the samples 11 to 15. FIG. 20 shows the relationship between the neck height NH and the S/N of each of the samples 11 to 15. FIG. 21 shows the relationship between the neck height NH and the SF of each of the samples 11 to 15.

In the experiment, next, various characteristics of four types of samples of magnetic heads having different throat heights TH were obtained to examine the relationship between the throat height TH and the characteristics of the magnetic head. The four types of samples will be hereinafter called samples 21 to 24. The characteristics obtained were: the OW (dB), the NLTS (dB), the S/N (dB), the MWW (μm), and the SF (μm). For each of the samples 21 to 24, the table below shows the values of NH (μm), TH(μm), NH/TH, PWA (μm), PWB (μm), PT (μm), OW (dB), NLTS (dB), S/N (dB), MWW (μm), and SF (μm). The WG of each of the samples 21 to 24 was 0.04 μm. In the experiment, twenty-five samples were fabricated for each of the types of the magnetic heads. The value listed in the table are mean values of the twenty-five samples.

TABLE 5

| Sample | NH | TH | NH/TH | PWA | PWB | PT | OW | NLTS | S/N | MWW | SF |
|---|---|---|---|---|---|---|---|---|---|---|---|
| 21 | 0.12 | 0.10 | 1.20 | 0.140 | 0.061 | 0.280 | 45.4 | −17.1 | 9.92 | 0.214 | 0.074 |
| 22 | 0.12 | 0.15 | 0.80 | 0.140 | 0.060 | 0.279 | 43.8 | −17.9 | 10.0 | 0.210 | 0.070 |
| 23 | 0.12 | 0.25 | 0.48 | 0.142 | 0.063 | 0.282 | 38.6 | −18.7 | 10.1 | 0.203 | 0.061 |
| 24 | 0.12 | 0.35 | 0.3429 | 0.137 | 0.060 | 0.281 | 35.5 | −20.3 | 10.2 | 0.195 | 0.058 |

Figure 22:
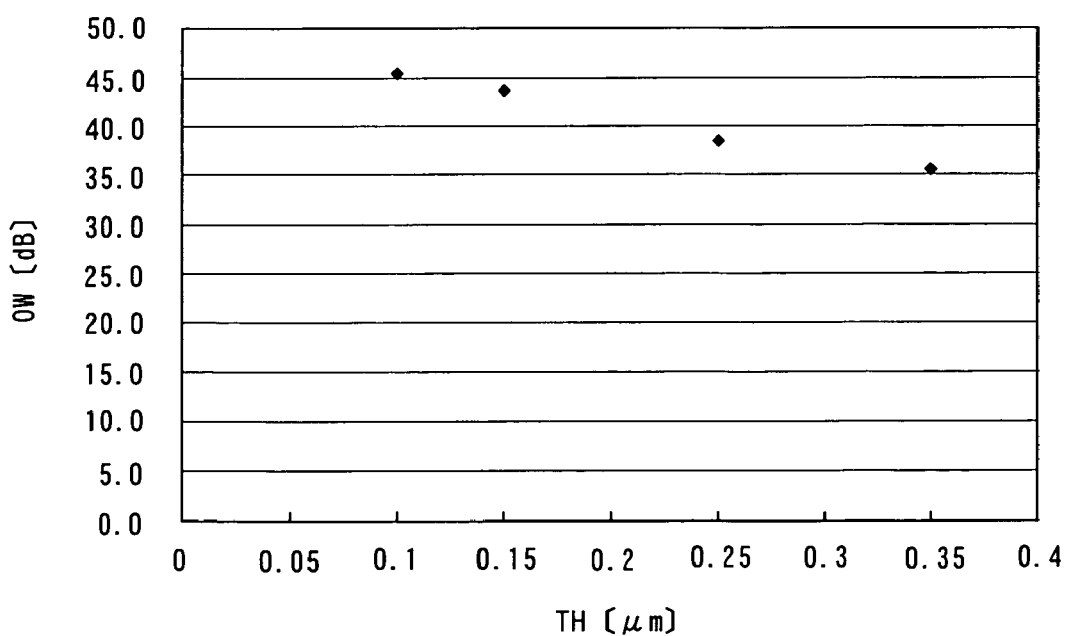
FIG. 22 is a plot showing the relationship between the throat height and the overwrite property obtained in the experiment.
Figure 23:
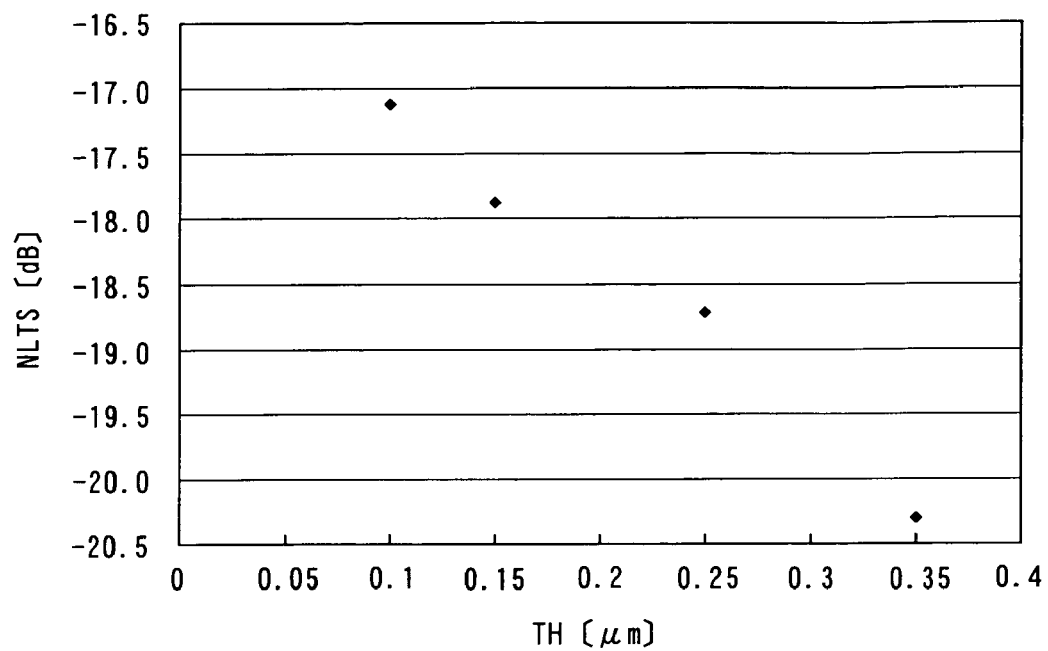
FIG. 23 is a plot showing the relationship between the throat height and the nonlinear transition shift obtained in the experiment.
Figure 24:
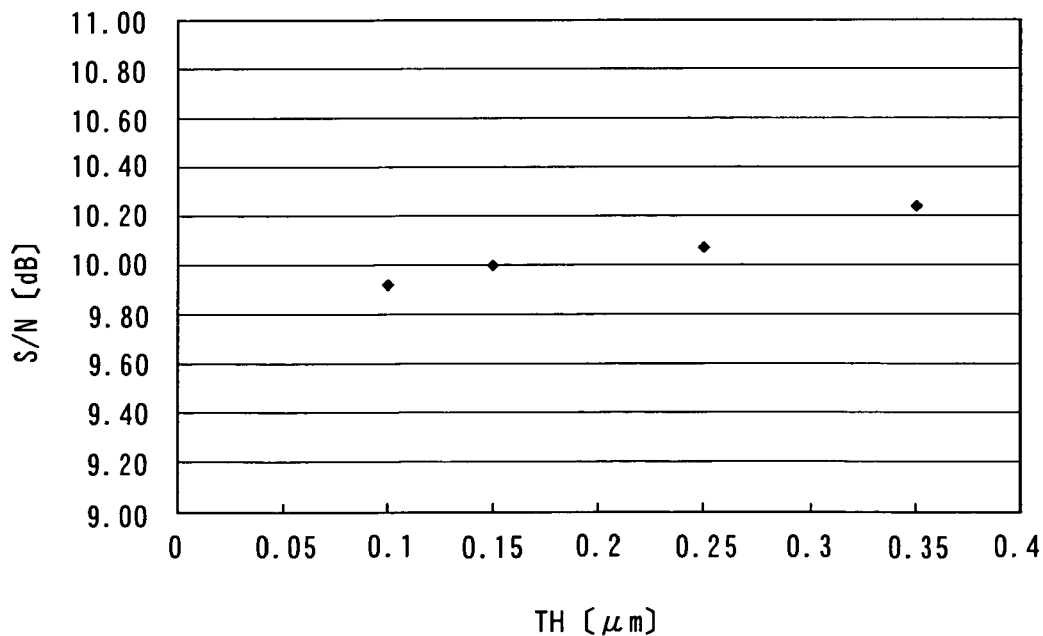
FIG. 24 is a plot showing the relationship between the throat height and the signal-to-noise ratio obtained in the experiment.
Figure 25:
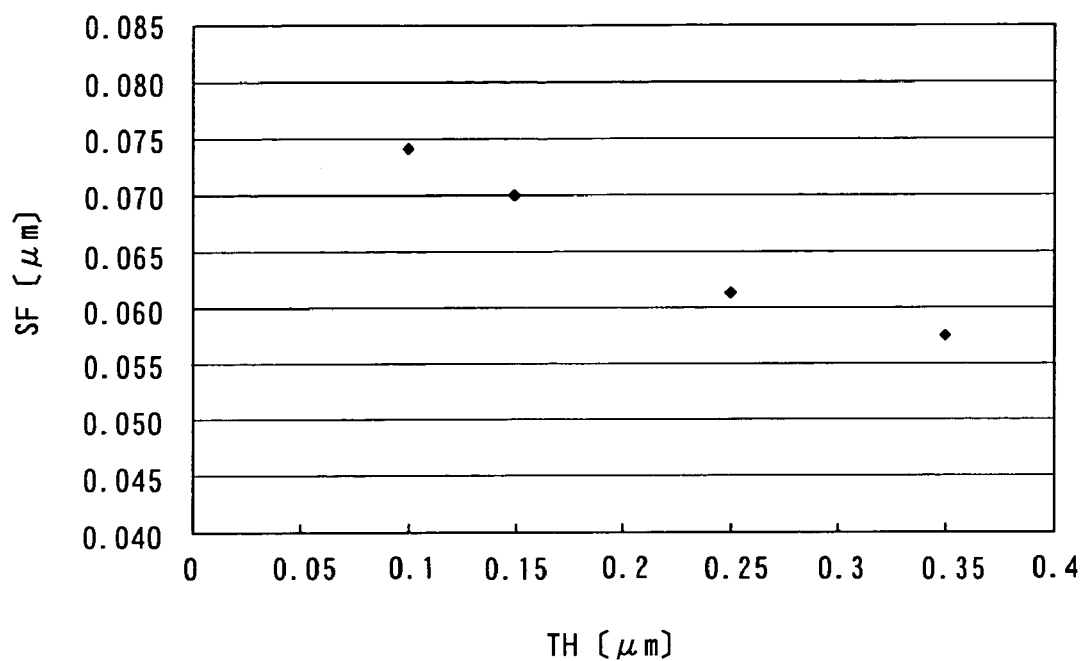
FIG. 25 is a plot showing the relationship between the throat height and the side fringe obtained in the experiment.

FIG. 22 shows the relationship between the throat height TH and the OW of each of the samples 21 to 24. FIG. 23 shows the relationship between the throat height TH and the NLTS of each of the samples 21 to 24. FIG. 24 shows the relationship between the throat height TH and the S/N of each of the samples 21 to 24. FIG. 25 shows the relationship between the throat height TH and the SF of each of the samples 21 to 24.

Magnetic heads preferably have such characteristics that the OW is as great as possible, the NLTS is as small as possible, the S/N is as great as possible, and the SF is as small as possible. FIG. 18 to FIG. 21 indicate that, if the neck height NH is reduced, the OW, the NLTS and the S/N are improved while the SF is increased. On the other hand, FIG. 22 to FIG. 25 indicate that, if the throat height TH is increased, the NLTS and the S/N are improved and the SF is decreased, but the OW is degraded. However, the sensitivity of each of the OW and the SF to the throat height TH is lower than the sensitivity of each of the OW and the SF to the neck height NH. Therefore, improvements in the OW, the NLTS and the S/N together with suppression in increase in the SF may be achieved by reducing the neck height NH and increasing the throat height TH, that is, by reducing the value of NH/TH.

Figure 26:
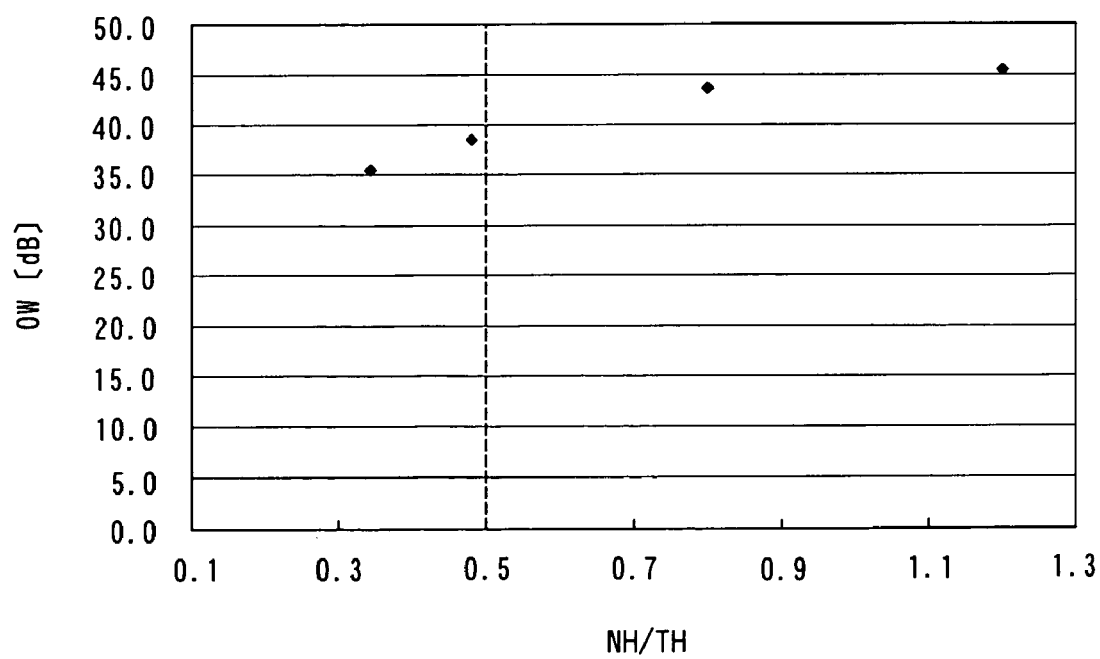
FIG. 26 is a plot showing the relationship between NH/TH and the overwrite property obtained in the experiment.
Figure 27:
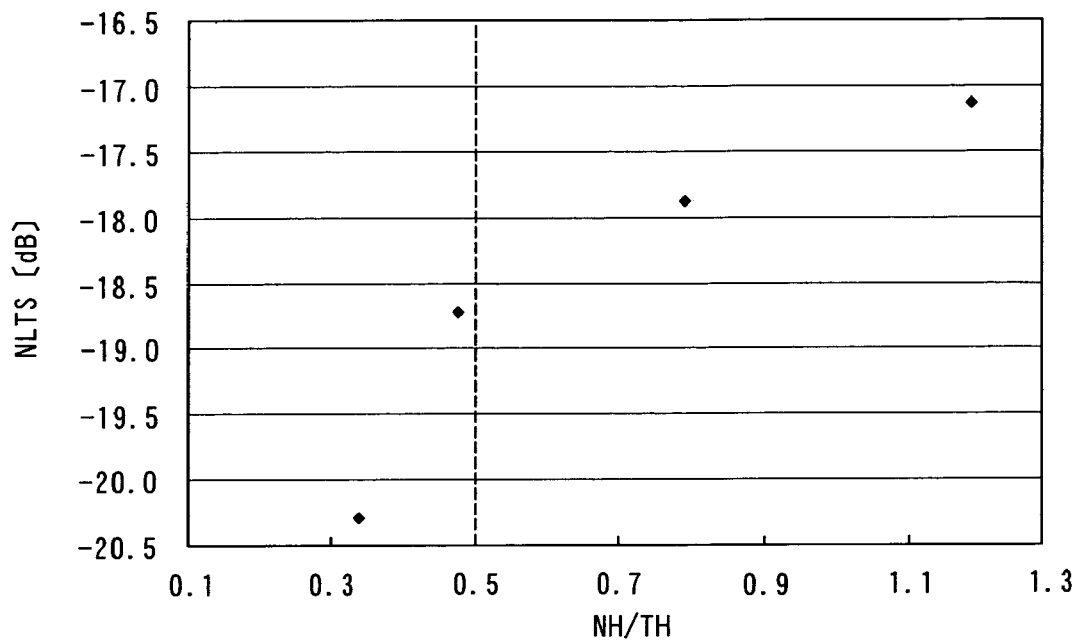
FIG. 27 is a plot showing the relationship between NH/TH and the nonlinear transition shift obtained in the experiment.
Figure 28:
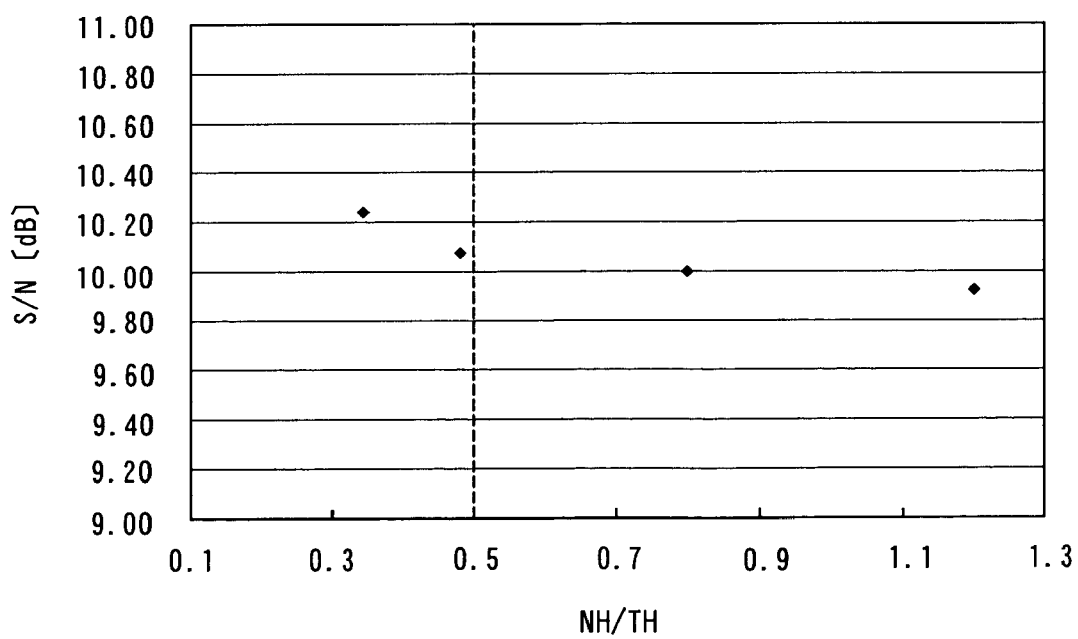
FIG. 28 is a plot showing the relationship between NH/TH and the signal-to-noise ratio obtained in the experiment.
Figure 29:
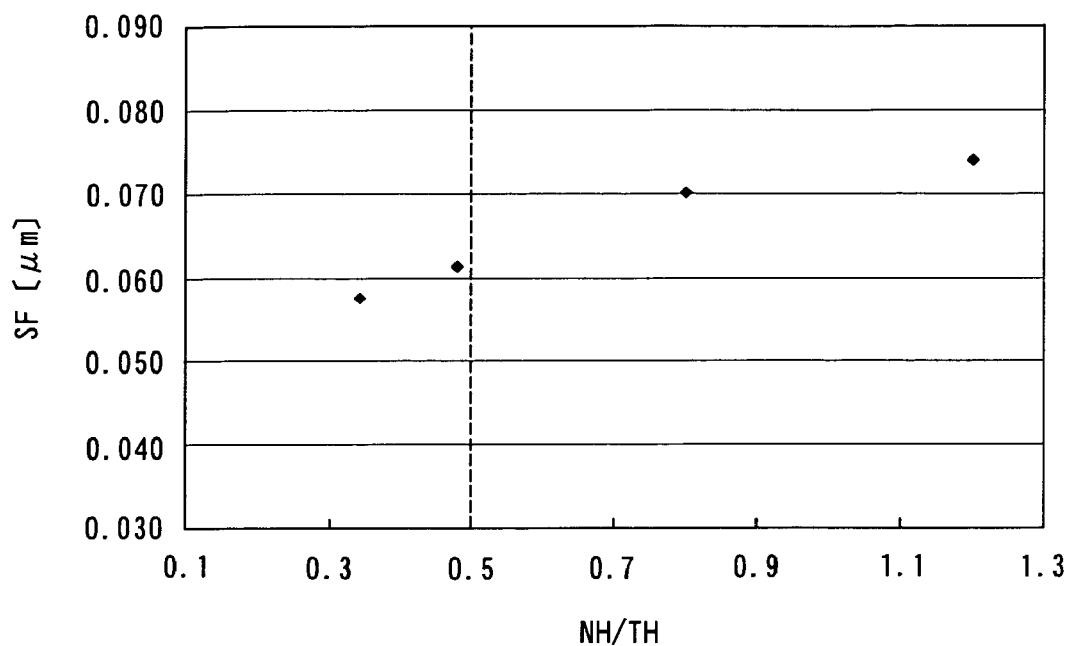
FIG. 29 is a plot showing the relationship between NH/TH and the side fringe obtained in the experiment.

Then, the relationship between the value of NH/TH and each of the OW, the NLTS, the S/N and the SF was examined. FIG. 26 shows the relationship between the value of NH/TH and the OW of each of the samples 21 to 24. FIG. 27 shows the relationship between the value of NH/TH and the NLTS of each of the samples 21 to 24. FIG. 28 shows the relationship between the value of NH/TH and the S/N of each of the samples 21 to 24. FIG. 29 shows the relationship between the value of NH/TH and the SF of each of the samples 21 to 24. FIG. 26 to FIG. 29 indicate that, if the value of NH/TH is reduced, the NLTS and the S/N are improved and the SF is decreased, but the OW is degraded. However, only a small degree of degradation in the OW is caused by the reduction in NH/TH. As shown in FIG. 26 to FIG. 29, as long as the value of NH/TH is greater than zero and smaller than or equal to 0.5, all of the OW, the NLTS, the S/N and the SF are improved.

Figure 30:
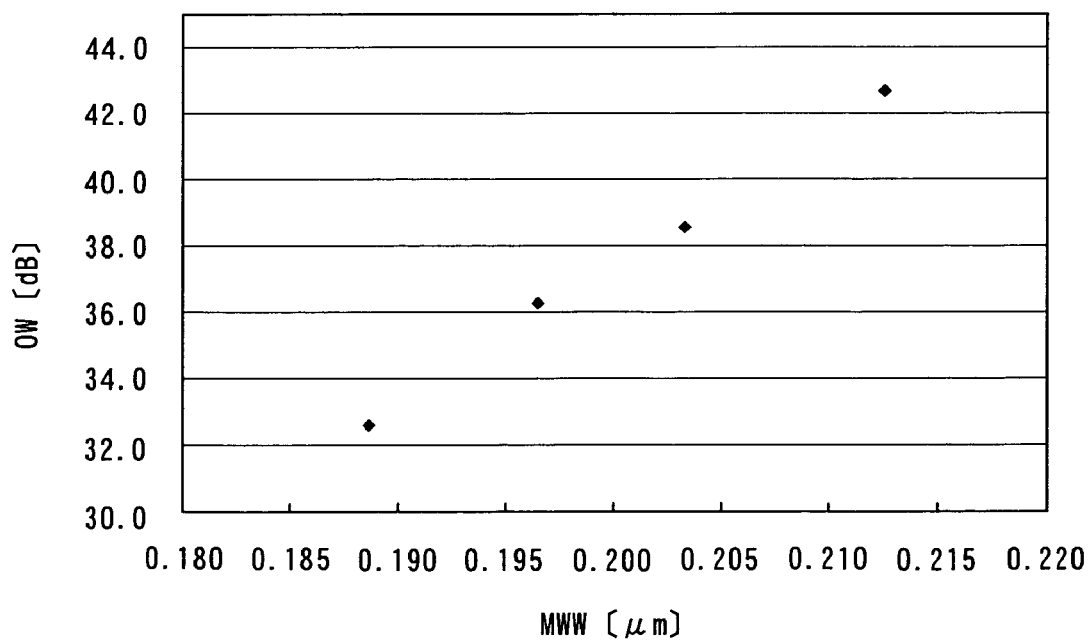
FIG. 30 is a plot showing the relationship between the effective write track width and the overwrite property obtained in the experiment.
Figure 31:
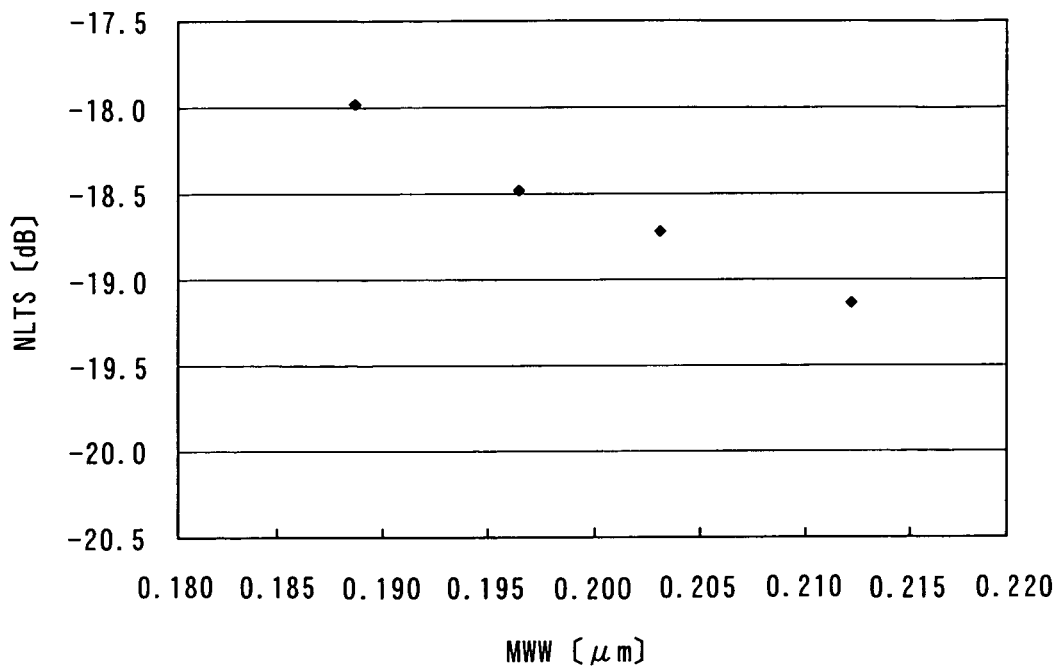
FIG. 31 is a plot showing the relationship between the effective write track width and the nonlinear transition shift obtained in the experiment.
Figure 32:
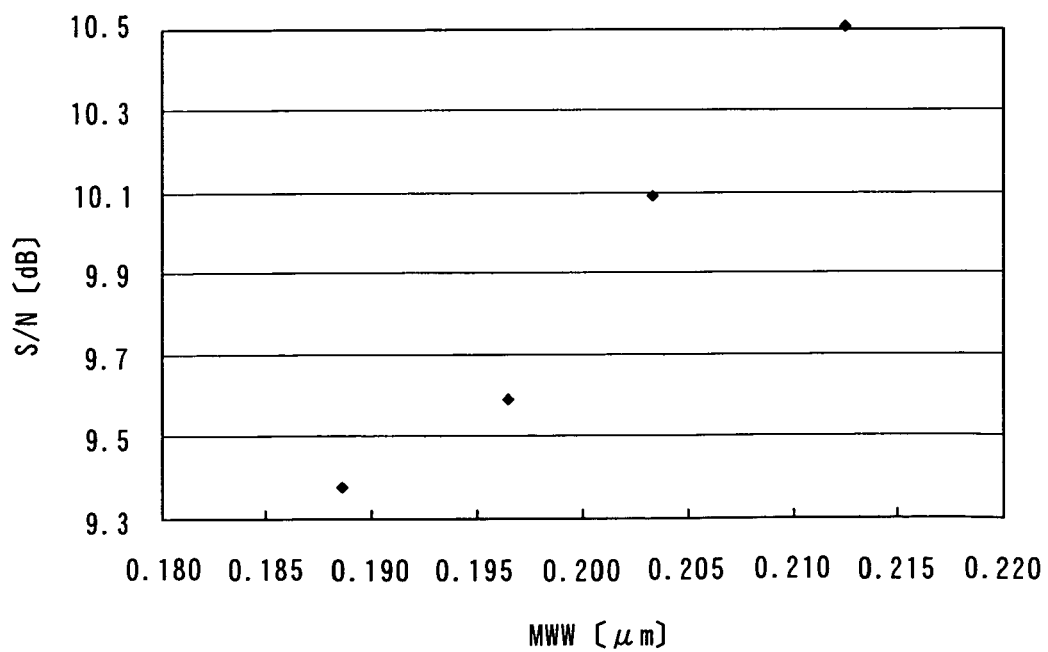
FIG. 32 is a plot showing the relationship between the effective write track width and the signal-to-noise ratio obtained in the experiment.

Consideration will now be given to the relationship between the neck height NH and the MWW, and the relationship between the MWW and each of the OW, the NLTS and the S/N. The relationship between the neck height NH and the MWW of each of the samples 11 to 15 indicates that the MWW is increased if the neck height NH is reduced. FIG. 30 shows the relationship between the MWW and the OW of each of the samples 12 to 15. FIG. 31 shows the relationship between the MWW and the NLTS of each of the samples 12 to 15. FIG. 32 shows the relationship between the MWW and the S/N of each of the samples 12 to 15. It is required to reduce the MWW for achieving higher recording density. However, as also shown in FIG. 30 to FIG. 32, the OW, the NLTS and the S/N are typically degraded if the MWW is decreased.

Figure 33:
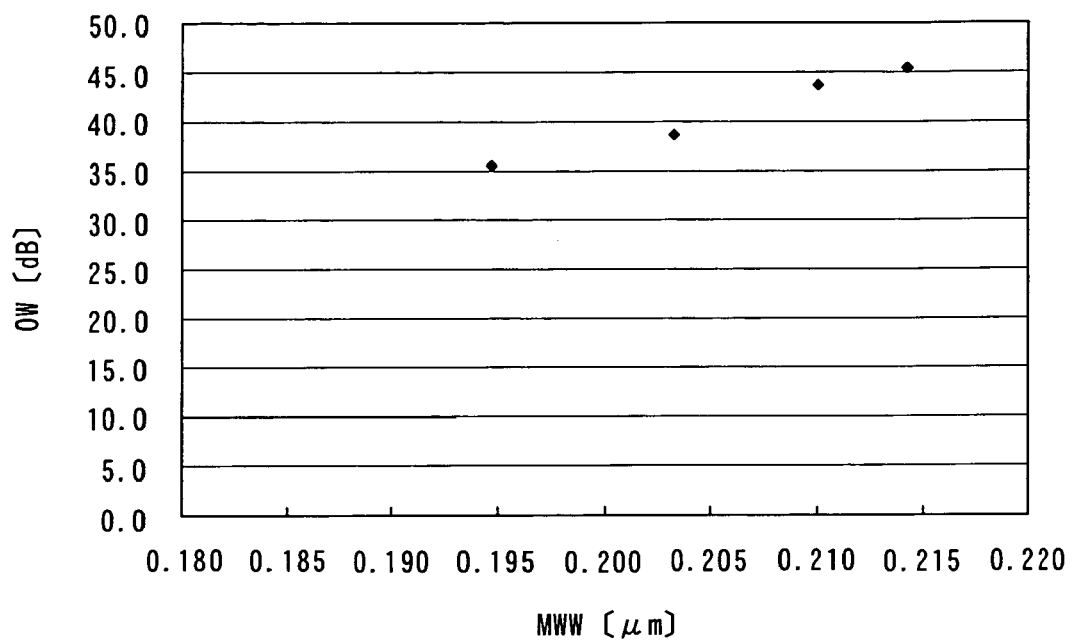
FIG. 33 is a plot showing the relationship between the effective write track width and the overwrite property obtained in the experiment.
Figure 34:
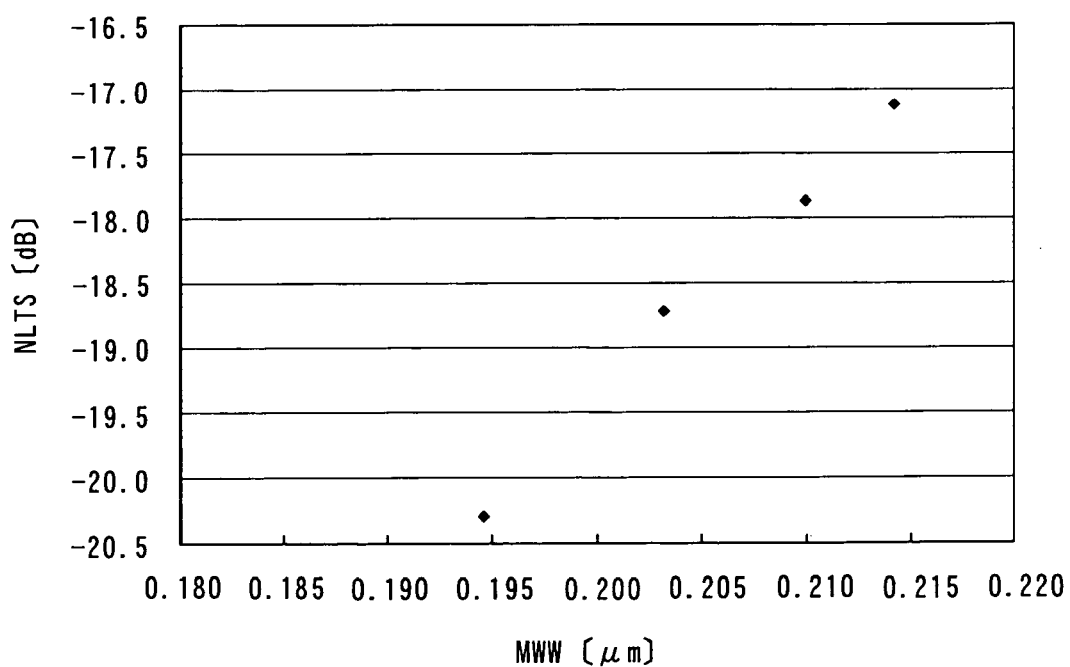
FIG. 34 is a plot showing the relationship between the effective write track width and the nonlinear transition shift obtained in the experiment.
Figure 35:
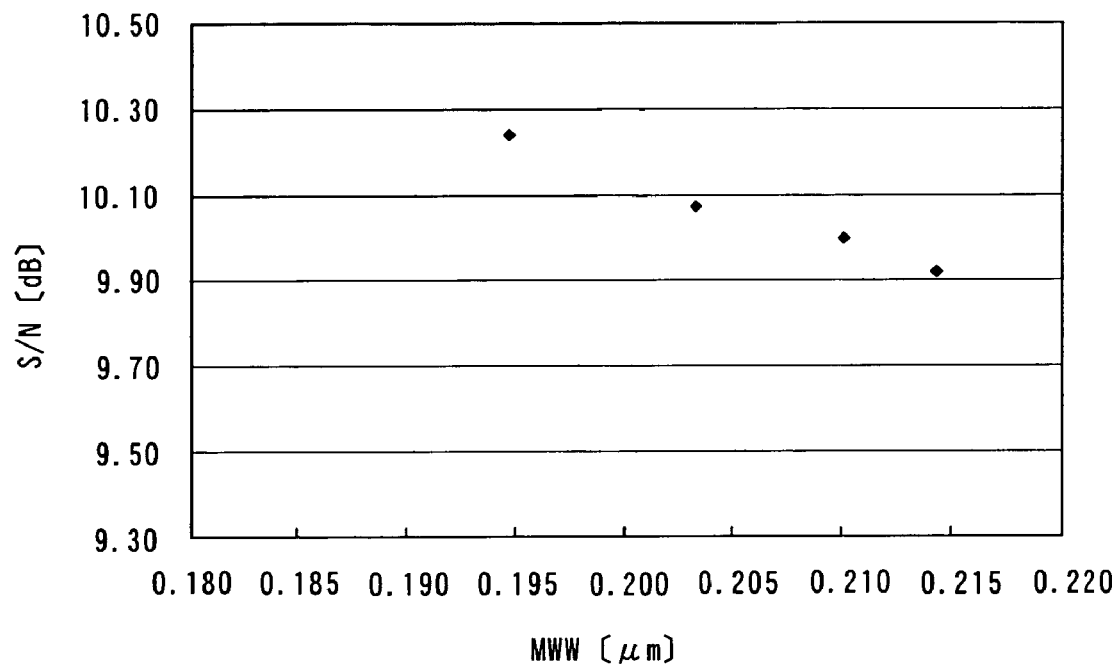
FIG. 35 is a plot showing the relationship between the effective write track width and the signal-to-noise ratio obtained in the experiment.

On the other hand, the relationship between the throat height TH and the MWW of each of the samples 21 to 24 indicates that the MWW is decreased if the throat height TH is increased. FIG. 33 shows the relationship between the MWW and the OW of each of the samples 21 to 24. FIG. 34 shows the relationship between the MWW and the NLTS of each of the samples 21 to 24. FIG. 35 shows the relationship between the MWW and the S/N of each of the samples 21 to 24. FIG. 33 to FIG. 35 indicate that, if the MWW is decreased by increasing the throat height TH, the degradation in the OW is small, and the NLTS and the S/N are improved.

The foregoing findings indicate that, to decrease the MWW while improving all of the OW, NLTS, S/N and SF, it is effective to decrease the neck height NH and to increase the throat height TH, that is, to decrease the value of NH/TH. As previously described, the value of NH/TH is preferably greater than zero and smaller than or equal to 0.5.

Next, the relationship between the value of NH/TH and each of the write field intensity, the magnetic field gradient and the MWW was examined by simulation. First, to confirm the validity of the values of the write field intensity, the field gradient and the MWW obtained by simulation, the correlation between the samples 11 to 15 of the magnetic heads shown in table 4 and models 11 to 15 of the magnetic heads used in the simulation was examined. The models 11 to 15 corresponded to the samples 11 to 15, respectively. For each of the models 11 to 15, the WG was 0.04 μm, the PWA was 0.15 μm, the PWB was 0.08 μm, and the PT was 0.28 μm. In the simulation using the models 11 to 15, the distance between a soft magnetic underlying layer (SUL) of a recording medium and the end face of the pole layer 10 located in the medium facing surface 20 was 50 nm. In addition, a location at a distance of 20 nm from the end face of the pole layer 10 located in the medium facing surface 20 was defined as a location where to place a recording layer of the medium, and magnetic characteristics at this location were examined.

For each of the models 11 to 15, the table below shows the values of the NH (μm), the TH (μm), NH/TH, the write field intensity (Oe), the field gradient (Oe/nm), and the MWW (elm). The values of the write field intensity, the field gradient, and the MWW were obtained by calculation in the simulation.

TABLE 6

| Model | NH | TH | NH/TH | Write field intensity | Field gradient | MWW |
|---|---|---|---|---|---|---|
| 11 | 0.05 | 0.25 | 0.20 | 16666 | 314 | 0.206 |
| 12 | 0.08 | 0.25 | 0.32 | 15631 | 305 | 0.199 |
| 13 | 0.12 | 0.25 | 0.48 | 14250 | 292 | 0.189 |
| 14 | 0.15 | 0.25 | 0.60 | 13214 | 283 | 0.182 |
| 15 | 0.18 | 0.25 | 0.72 | 12178 | 274 | 0.175 |

Figure 36:
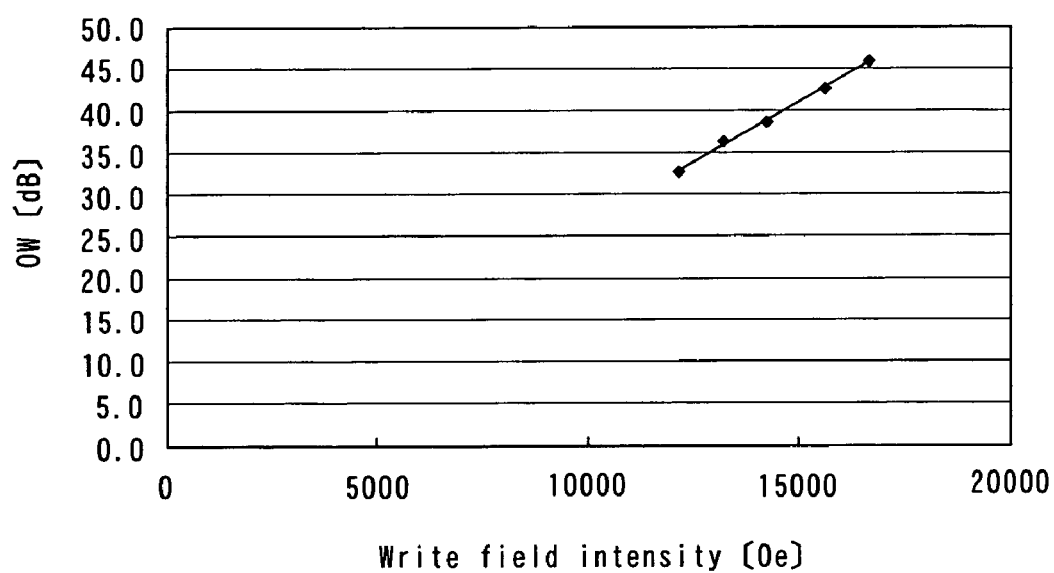
FIG. 36 is a plot showing the relationship between the write field intensity of models used in the experiment and the overwrite property of samples.

FIG. 36 shows the relationship between the write field intensity of the models 11 to 15 and the OW of the samples 11 to 15. The respective diamond-shaped marks in the plot indicate the write field intensity of the model 11 and the OW of the sample 11, the write field intensity of the model 12 and the OW of the sample 12, the write field intensity of the model 13 and the OW of the sample 13, the write field intensity of the model 14 and the OW of the sample 14, and the write field intensity of the model 15 and the OW of the sample 15. There is a close correlation between the write field intensity and the OW of the magnetic heads. The square of the correlation coefficient of the write field intensity and the OW of FIG. 36 is 0.9968.

Figure 37:
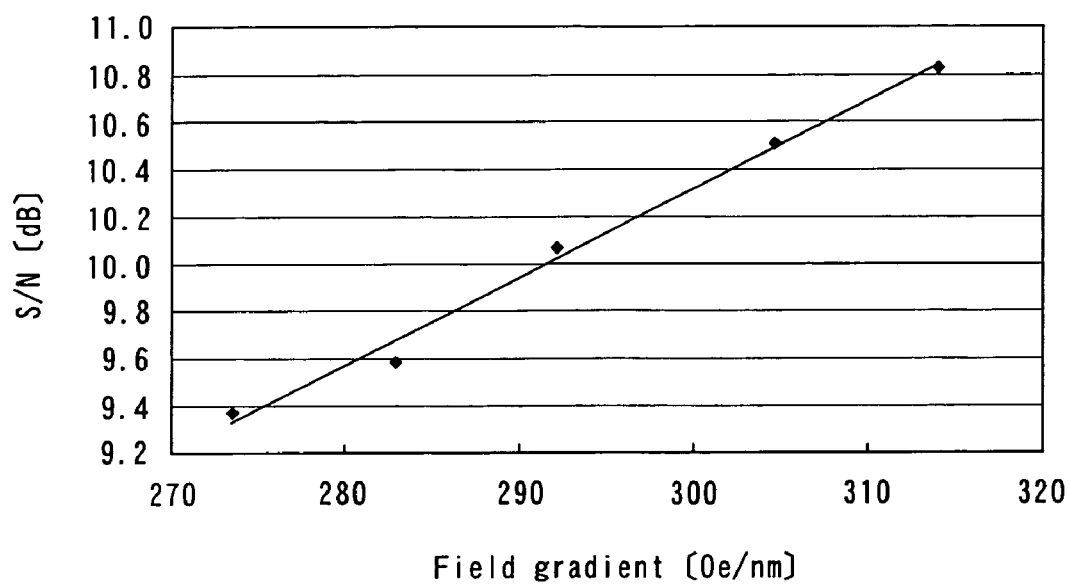
FIG. 37 is a plot showing the relationship between the magnetic field gradient of the models used in the experiment and the signal-to-noise ratio of the samples.

FIG. 37 shows the relationship between the magnetic field gradient of the models 11 to 15 and the value of S/N of the samples 11 to 15. The respective diamond-shaped marks in the plot indicate the field gradient of the model 11 and the value of S/N of the sample 11, the field gradient of the model 12 and the value of S/N of the sample 12, the field gradient of the model 13 and the value of S/N of the sample 13, the field gradient of the model 14 and the value of S/N of the sample 14, and the field gradient of the model 15 and the value of S/N of the sample 15. There is a close correlation between the field gradient and the value of S/N of the magnetic heads. The square of the correlation coefficient of the field gradient and the value of S/N of FIG. 37 is 0.9919.

Figure 38:
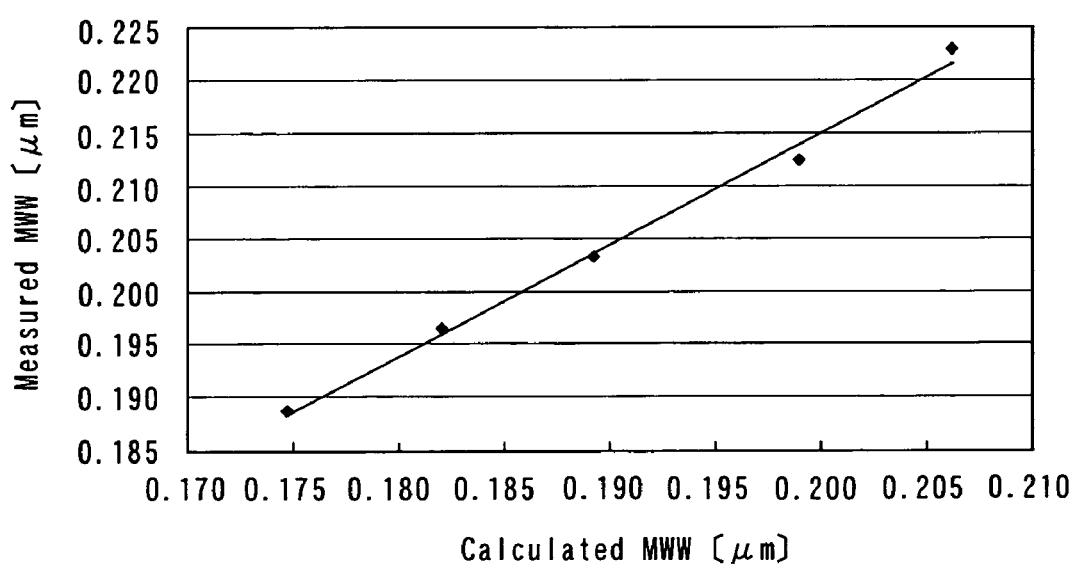
FIG. 38 is a plot showing the relationship between the calculated effective write track width of the models used in the experiment and the measured effective write track width of the samples.

FIG. 38 shows the relationship between the calculated MWW of the models 11 to 15 and the measured MWW of the samples 11 to 15. The respective diamond-shaped marks in the plot indicate the MWW of the model 11 and the MWW of the sample 11, the MWW of the model 12 and the MWW of the sample 12, the MWW of the model 13 and the MWW of the sample 13, the MWW of the model 14 and the MWW of the sample 14, and the MWW of the model 15 and the MWW of the sample 15. The square of the correlation coefficient of the calculated MWW and the measured MWW of FIG. 38 is 0.9938.

FIG. 36 to FIG. 38 indicate that there is a close correlation between the samples 11 to 15 and the models 11 to 15. This means that there is validity in the values of write field intensity, magnetic field gradient and MWW obtained by simulation. Then, simulation was performed to examine the relationship between the value of NH/TH and each of the write field intensity, the field gradient and the MWW, wherein the write field intensity, the field gradient and the MWW were obtained by simulation for twelve models including models 31 to 34, 41 to 44, and 51 to 54. For each of the models, the table below shows the values of NH (μm), TH (μm), NH/TH, the write field intensity (Oe), the field gradient (Oe/nm), and MWW (μm). Conditions for the models other than those listed in the table were the same as those for the models 11 to 15.

TABLE 7

| Model | NH | TH | NH/TH | Write field Intensity | Field gradient | MWW |
|---|---|---|---|---|---|---|
| 31 | 0.06 | 0.05 | 1.2 | 19379 | 317 | 0.228 |
| 32 | 0.06 | 0.1 | 0.6 | 18614 | 315 | 0.222 |
| 33 | 0.06 | 0.2 | 0.3 | 17086 | 312 | 0.210 |
| 34 | 0.06 | 0.3 | 0.2 | 15557 | 309 | 0.198 |
| 41 | 0.12 | 0.05 | 2.4 | 17307 | 298 | 0.214 |
| 42 | 0.12 | 0.1 | 1.2 | 16543 | 297 | 0.208 |
| 43 | 0.12 | 0.2 | 0.6 | 15014 | 294 | 0.195 |
| 44 | 0.12 | 0.3 | 0.4 | 13485 | 291 | 0.183 |
| 51 | 0.18 | 0.05 | 3.6 | 15236 | 279 | 0.199 |
| 52 | 0.18 | 0.1 | 1.8 | 14471 | 278 | 0.193 |

TABLE 7-continued

| Model | NH | TH | NH/TH | Write field Intensity | Field gradient | MWW |
|---|---|---|---|---|---|---|
| 53 | 0.18 | 0.2 | 0.9 | 12943 | 275 | 0.181 |
| 54 | 0.18 | 0.3 | 0.6 | 11414 | 272 | 0.169 |

Figure 39:
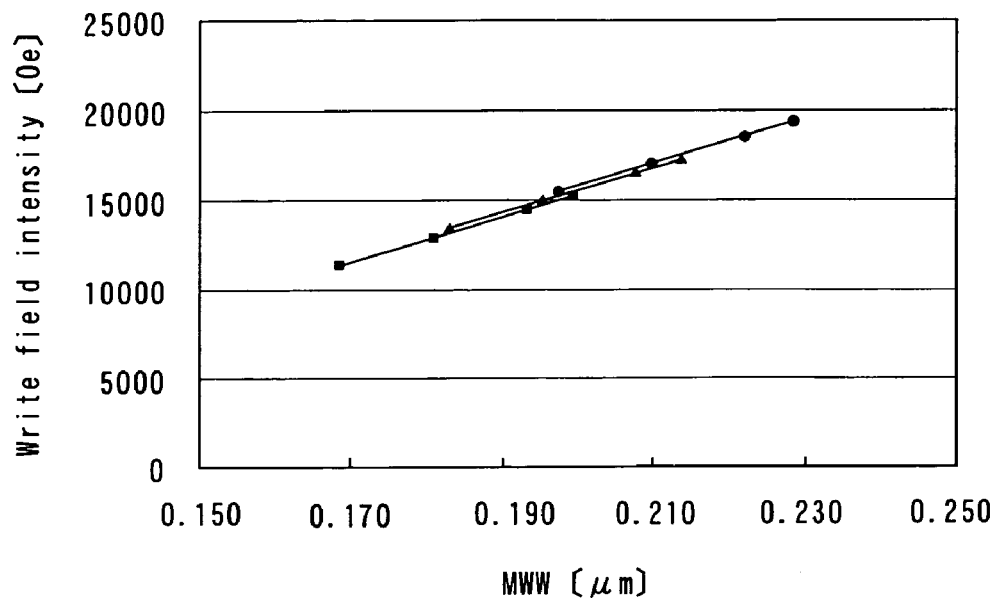
FIG. 39 is a plot showing the relationship between the effective write track width and the write field intensity of models used in the experiment.

FIG. 39 shows the relationship between the MWW and the write field intensity of the models 31 to 34, 41 to 44, and 51 to 54. In FIG. 39, dots indicate the relationship between the MWW and the write field intensity of the models 31 to 34. Deltas indicate the relationship between the MWW and the write field intensity of the models 41 to 44. Squares indicate the relationship between the MWW and the write field intensity of the models 51 to 54.

Figure 40:
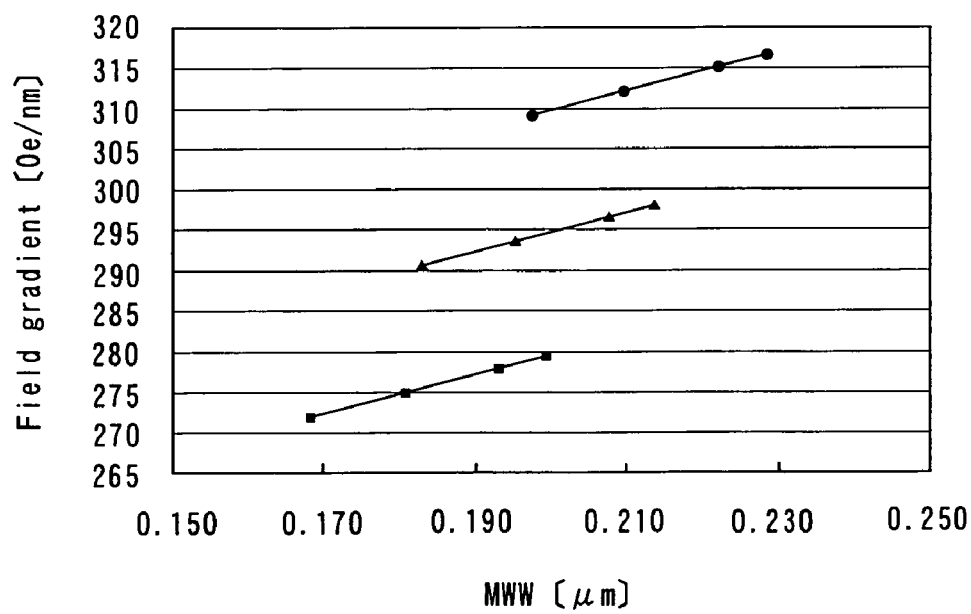
FIG. 40 is a plot showing the relationship between the effective write track width and the field gradient of the models used in the experiment.

FIG. 40 shows the relationship between the MWW and the magnetic field gradient of the models 31 to 34, 41 to 44, and 51 to 54. In FIG. 40, dots indicate the relationship between the MWW and the field gradient of the models 31 to 34. Deltas indicate the relationship between the MWW and the field gradient of the models 41 to 44. Squares indicate the relationship between the MWW and the field gradient of the models 51 to 54.

As shown in table 7, FIG. 39 and FIG. 40, it is preferred that the neck height NH be small to increase the write field intensity and the field gradient. However, the MWW is increased if the neck height NH is reduced. On the other hand, if the throat height TH is increased, the write field intensity and the field gradient are slightly decreased while the MWW is greatly decreased. Therefore, to increase the write field intensity and the field gradient while reducing the MWW, it is effective to decrease the neck height NH and to increase the throat height TH, that is, to decrease the value of NH/TH.

Here is shown a result of obtaining the write field intensity, the field gradient and the MWW by simulation for three models 61 to 63 having different neck heights NH and throat heights TH but equal MWWs. For each of the models, the table below shows the values of the NH (μm), the TH (μm), NH/TH, the write field intensity (Oe), the field gradient (Oe/nm), and the MWW (μm). Conditions for the models other than those listed in the table were the same as those for the models 11 to 15.

TABLE 8

| model | NH | TH | NH/TH | Write field intensity | Field gradient | MWW |
|---|---|---|---|---|---|---|
| 61 | 0.06 | 0.3 | 0.20 | 15557 | 309 | 0.198 |
| 62 | 0.12 | 0.18 | 0.67 | 15320 | 294 | 0.198 |
| 63 | 0.18 | 0.06 | 3.00 | 15083 | 279 | 0.198 |

Figure 41:
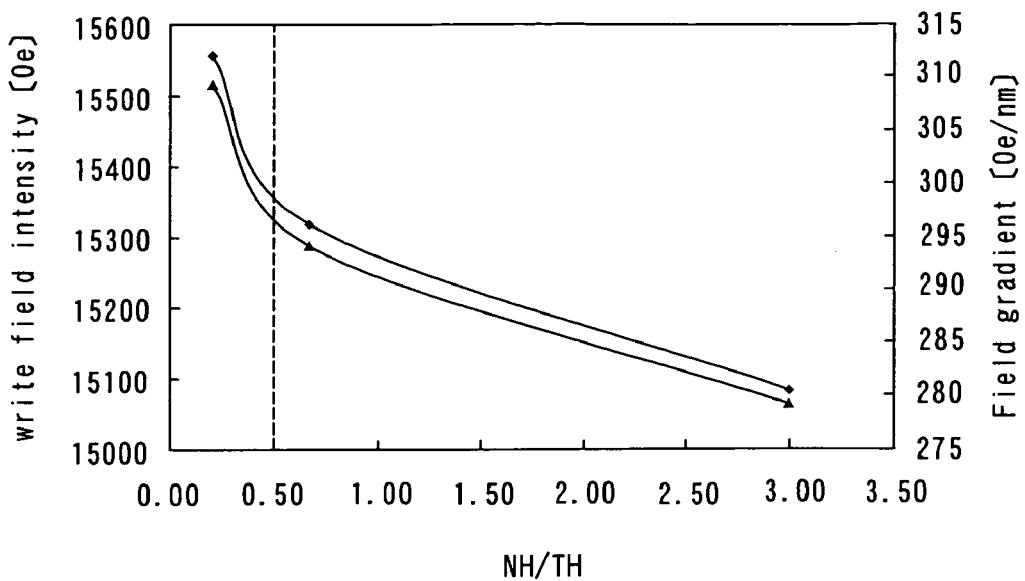
FIG. 41 is a plot showing the relationship between NH/TH and each of the write field intensity and the field gradient of the models used in the experiment.

FIG. 41 shows the relationship between the value of NH/TH and each of the write field intensity and the magnetic field gradient for the models 61 to 63. In FIG. 41, squares indicate the relationship between the value of NH/TH and the write field intensity. Deltas indicate the relationship between the value of NH/TH and the field gradient. As shown in FIG. 41, it is possible to increase the write field intensity and the magnetic field gradient without changing the MWW if the value of NH/TH is greater than zero and smaller than or equal to 0.5.

Japanese Published Patent Application 2004-295987 discloses a technique for ensuring write characteristics by satisfying conditions of NH ≦ W1+0.05 μm and 0.5<NH/TH<1.6, where TH (μm) is the throat height, W1 (μm) is the track width, and NH (μm) is the neck height. According to this technique, no consideration is given to reducing the MWW. However, a further reduction in MWW will be sought as higher recording density is desired. To reduce the MWW, it is required to reduce the PWA and the PT that are dimensions of the pole layer 10 taken in the medium facing surface 20. Consequently, writing capabilities such as the write field intensity and the magnetic field gradient are degraded. Therefore, it is required that the value of NH/TH be greater than zero and smaller than or equal to 0.5 as previously described in order to reduce the MWW while sufficiently increasing the writing capabilities. To achieve higher recording density, the neck height NH is preferably greater than zero and smaller than or equal to 0.3 μm, and more preferably falls within a range of 0.03 to 0.2 μm inclusive. Similarly, to achieve higher recording density, the throat height TH is preferably greater than zero and smaller than or equal to 0.5 μm, and more preferably falls within a range of 0.05 to 0.4 μm inclusive.

Figure 42:
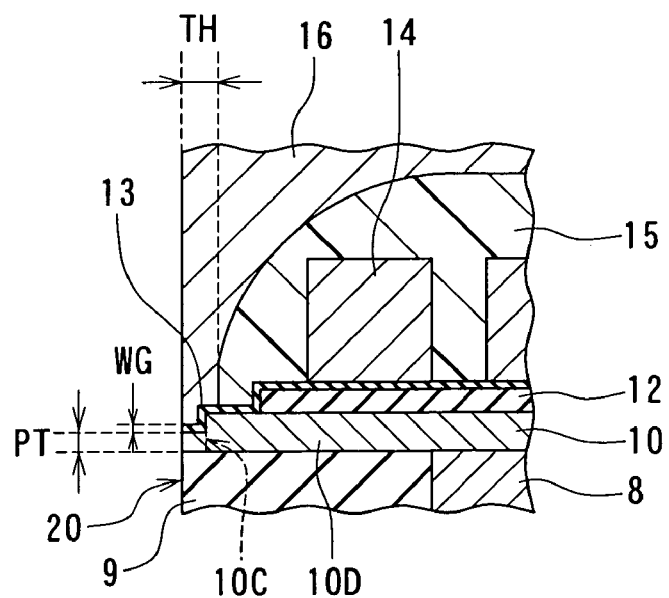
FIG. 42 is a cross-sectional view for illustrating the pole layer, the gap layer and the write shield layer near the medium facing surface of a magnetic head of a first modification example of the embodiment of the invention.
Figure 43:
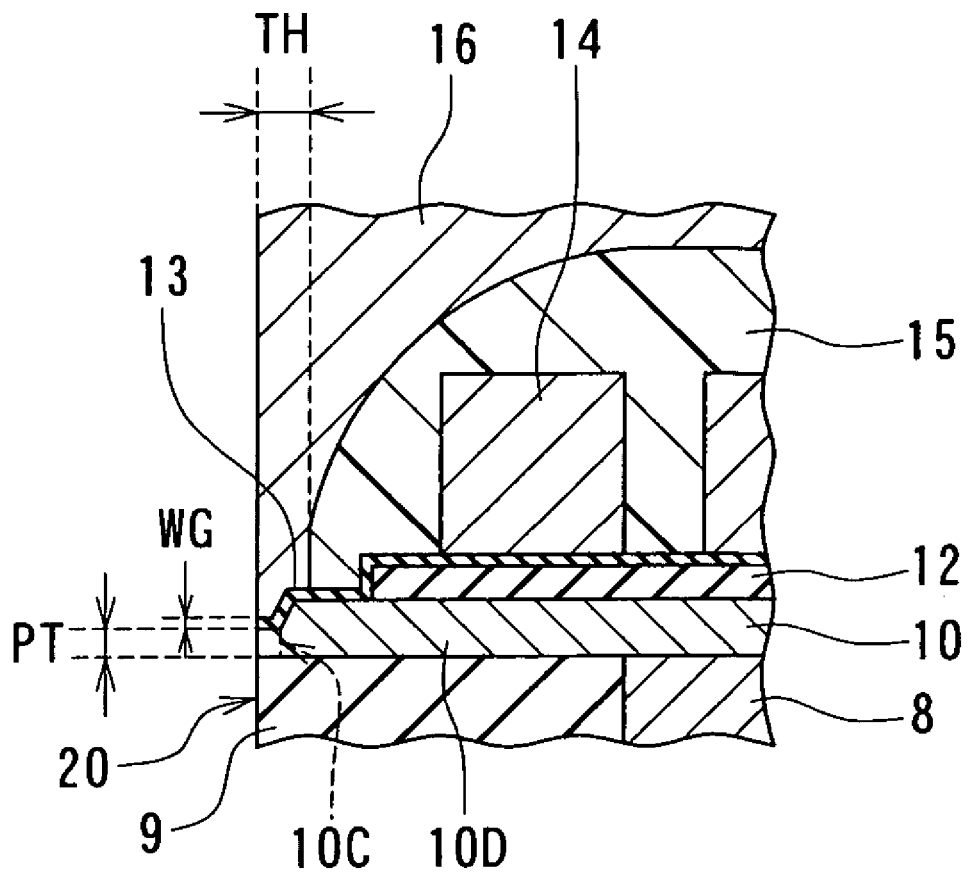
FIG. 43 is a cross-sectional view for illustrating the pole layer, the gap layer and the write shield layer near the medium facing surface of a magnetic head of a second modification example of the embodiment of the invention.

Reference is now made to FIG. 42 and FIG. 43 to describe first and second modification examples of the magnetic head of the embodiment. FIG. 42 is a cross-sectional view for illustrating the pole layer, the gap layer and the write shield layer near the medium facing surface of the magnetic head of the first modification example. FIG. 43 is a cross-sectional view for illustrating the pole layer, the gap layer and the write shield layer near the medium facing surface of the magnetic head of the second modification example.

In each of the first and second modification examples, as shown in FIG. 42 and FIG. 43, the pole layer 10 incorporates: a first portion 10C having the end face located in the medium facing surface 20; and a second portion 10D having a thickness greater than that of the first portion 10C and located farther from the medium facing surface 20 than the first portion 10C. The top surface of the first portion 10C is located closer to the substrate 1 than the top surface of the second portion 10D.

In the first modification example, the top surface of the first portion 10C is connected to the top surface of the second portion 10D by a surface parallel to the medium facing surface 20. In the second modification example, the top surface of the first portion 10C is connected to the top surface of the second portion 10D by a surface tilted with respect to the medium facing surface 20. In each of the modification examples, near the medium facing surface 20, the top surface of the pole layer 10 is bent, and the gap layer 13 is also bent to correspond to the shape of the top surface of the pole layer 10. Furthermore, the bottom surface of the write shield layer 16 facing toward the pole layer 10 with the gap layer 13 disposed in between is also bent to correspond to the shape of the top surface of the pole layer 10. The remainder of configuration of each of the first and second modification examples are the same as that of the magnetic head shown in FIG. 1 to FIG. 6.

In the embodiment, also in the case in which the top surface of the pole layer 10 and the bottom surfaces of the gap layer 13 and the write shield layer 16 are bent as in the first and second modifications examples, the distance from the medium facing surface 20 to the point at which the space between the pole layer 10 and the write shield layer 16 starts to be greater than the gap thickness WG is defined as the throat height TH.

The present invention is not limited to the foregoing embodiment but can be practiced in still other ways. For example, while the magnetic head disclosed in the embodiment has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention can be practiced otherwise than as specifically described.

What is claimed is:

1. A magnetic head for perpendicular magnetic recording comprising:
   a medium facing surface that faces toward a recording medium;
   a coil for generating a magnetic field corresponding to data to be written on the recording medium;
   a pole layer having an end face located in the medium facing surface, allowing a magnetic flux corresponding to the field generated by the coil to pass therethrough, and generating a write magnetic field for writing the data on the recording medium by means of a perpendicular magnetic recording system;
   shield layer having an end face located in the medium facing surface and having a portion that is located away from the medium facing surface and coupled to the pole layer; and
   a gap layer made of a nonmagnetic material and provided between the pole layer and the shield layer, wherein:
      in the medium facing surface, the end face of the shield layer is located forward of the end face of the pole layer along a direction of travel of the recording medium with a specific space;
      the pole layer incorporates: a track width defining portion that has a first end located in the medium facing surface and a second end opposite to the first end, and that defines the track width; and a wide portion coupled to the second end of the track width defining portion and having a width greater than a width of the track width defining portion;
      the pole layer further has: a top surface facing toward the shield layer with the gap layer disposed in between; a first portion including the end face of the pole layer located in the medium facing surface; and a second portion located farther from the medium facing surface than the first portion, the top surface of the pole layer being bent such that the second portion has a thickness greater than a thickness of the first portion;
      the shield layer further has a bottom surface facing toward the pole layer with the gap layer disposed in between;
      the gap layer and the bottom surface of the shield layer are bent to correspond to a shape of the top surface of the pole layer; and
      a value of NH×TH/WG is greater than zero and smaller than or equal to 0.85 μm, where NH is a distance from the medium facing surface to a boundary between the track width defining portion and the wide portion, TH is a distance from the medium facing surface to a point at which a space between the pole layer and the shield layer starts to be greater than a space between the pole layer and the shield layer taken in the medium facing surface, and WG is the space between the pole layer and the shield layer taken in the medium facing surface.

2. The magnetic head according to claim 1, wherein a value of WG is greater than zero and smaller than or equal to 200 nm.

3. The magnetic head according to claim 1, wherein a value of NH/TH is greater than zero and smaller than or equal to 0.5.

4. A head gimbal assembly comprising:
a slider including a magnetic head for perpendicular magnetic recording and disposed to face toward a recording medium; and
a suspension flexibly supporting the slider, wherein:
the magnetic head comprises:
a medium facing surface that faces toward the recording medium;
a coil for generating a magnetic field corresponding to data to be written on the recording medium;
a pole layer having an end face located in the medium facing surface, allowing a magnetic flux corresponding to the field generated by the coil to pass therethrough, and generating a write magnetic field for writing the data on the recording medium through the use of a perpendicular magnetic recording system;
a shield layer having an end face located in the medium facing surface and having a portion that is located away from the medium facing surface and coupled to the pole layer; and
a gap layer made of a nonmagnetic material and provided between the pole layer and the shield layer,
in the medium facing surface, the end face of the shield layer is located forward of the end face of the pole layer along a direction of travel of the recording medium with a specific space;
the pole layer incorporates: a track width defining portion that has a first end located in the medium facing surface and a second end opposite to the first end, and that defines the track width; and a wide portion coupled to the second end of the track width defining portion and having a width greater than a width of the track width defining portion;
the pole layer further has: a top surface facing toward the shield layer with the gap layer disposed in between; a first portion including the end face of the pole layer located in the medium facing surface; and a second portion located farther from the medium facing surface than the first portion, the top surface of the pole layer being bent such that the second portion has a thickness greater than a thickness of the first portion;
the shield layer further has a bottom surface facing toward the pole layer with the gap layer disposed in between;
the gap layer and the bottom surface of the shield layer are bent to correspond to a shape of the top surface of the pole layer; and
a value of NH×TH/WG is greater than zero and smaller than or equal to 0.85 µm where NH is a distance from the medium facing surface to a boundary between the track width defining portion and the wide portion, TH is a distance from the medium facing surface to a point at which a space between the pole layer and the shield layer starts to be greater than a space between the pole layer and the shield layer taken in the medium facing surface, and WG is the space between the pole layer and the shield layer taken in the medium facing surface.

5. A head arm assembly comprising:
a slider including a magnetic head for perpendicular magnetic recording and disposed to face toward a recording medium;
a suspension flexibly supporting the slider; and
an arm for making the slider travel across tracks of the recording medium, the suspension being attached to the arm, wherein:
the magnetic head comprises:
a medium facing surface that faces toward the recording medium;
a coil for generating a magnetic field corresponding to data to be written on the recording medium;
a pole layer having an end face located in the medium facing surface, allowing a magnetic flux corresponding to the field generated by the coil to pass therethrough, and generating a write magnetic field for writing the data on the recording medium through the use of a perpendicular magnetic recording system;
a shield layer having an end face located in the medium facing surface and having a portion that is located away from the medium facing surface and coupled to the pole layer; and
a gap layer made of a nonmagnetic material and provided between the pole layer and the shield layer,
in the medium facing surface, the end face of the shield layer is located forward of the end face of the pole layer along a direction of travel of the recording medium with a specific space;
the pole layer incorporates: a track width defining portion that has a first end located in the medium facing surface and a second end opposite to the first end, and that defines the track width; and a wide portion coupled to the second end of the track width defining portion and having a width greater than a width of the track width defining portion;
the pole layer further has: a top surface facing toward the shield layer with the gap layer disposed in between; a first portion including the end face of the pole layer located in the medium facing surface; and a second portion located farther from the medium facing surface than the first portion, the top surface of the pole layer being bent such that the second portion has a thickness greater than a thickness of the first portion;
the shield layer further has a bottom surface facing toward the pole layer with the gap layer disposed in between;
the gap layer and the bottom surface of the shield layer are bent to correspond to a shape of the top surface of the pole layer; and
a value of NH×TH/WG is greater than zero and smaller than or equal to 0.85 µm where NH is a distance from the medium facing surface to a boundary between the track width defining portion and the wide portion, TH is a distance from the medium facing surface to a point at which a space between the pole layer and the shield layer starts to be greater than a space between the pole layer and the shield layer taken in the medium facing surface, and WG is the space between the pole layer and the shield layer taken in the medium facing surface.

6. A magnetic disk drive comprising:
a slider including a magnetic head for perpendicular magnetic recording and disposed to face toward a circular-plate-shaped recording medium that is driven to be rotated; and
an alignment device supporting the slider and aligning the slider with respect to the recording medium, wherein:
the magnetic head comprises:

a medium facing surface that faces toward the recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium through the use of a perpendicular magnetic recording system;

a shield layer having an end face located in the medium facing surface and having a portion that is located away from the medium facing surface and coupled to the pole layer; and a gap layer made of a nonmagnetic material and provided between the pole layer and the shield layer, in the medium facing surface, the end face of the shield layer is located forward of the end face of the pole layer along a direction of travel of the recording medium with a specific space;

the pole layer incorporates: a track width defining portion that has a first end located in the medium facing surface and a second end opposite to the first end, and that defines the track width; and a wide portion coupled to the second end of the track width defining portion and having a width greater than a width of the track width defining portion;

the pole layer further has: a top surface facing toward the shield layer with the gap layer disposed in between; a first portion including the end face of the pole layer located in the medium facing surface; and a second portion located farther from the medium facing surface than the first portion, the top surface of the pole layer being bent such that the second portion has a thickness greater than a thickness of the first portion;

the shield layer further has a bottom surface facing toward the pole layer with the gap layer disposed in between;

the gap layer and the bottom surface of the shield layer are bent to correspond to a shape of the top surface of the pole layer; and a value of NH×TH/WG is greater than zero and smaller than or equal to 0.85 μm, where NH is a distance from the medium facing surface to a boundary between the track width defining portion and the wide portion, TH is a distance from the medium facing surface to a point at which a space between the pole layer and the shield layer starts to be greater than a space between the pole layer and the shield layer taken in the medium facing surface, and WG is the space between the pole layer and the shield layer taken in the medium facing surface.

7. A magnetic head for perpendicular magnetic recording comprising:

a medium facing surface that faces toward a recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium by means of a perpendicular magnetic recording system;

a shield layer having an end face located in the medium facing surface and having a portion that is located away from the medium facing surface and coupled to the pole layer; and a gap layer made of a nonmagnetic material and provided between the pole layer and the shield layer, wherein:

in the medium facing surface, the end face of the shield layer is located forward of the end face of the pole layer along a direction of travel of the recording medium with a specific space;

the pole layer incorporates: a track width defining portion that has a first end located in the medium facing surface and a second end opposite to the first end, and that defines the track width; and a wide portion coupled to the second end of the track width defining portion and having a width greater than a width of the track width defining portion;

a value of NH×TH/WG is greater than zero and smaller than or equal to 0.85 μm, where NH is a distance from the medium facing surface to a boundary between the track width defining portion and the wide portion, TH is a distance from the medium facing surface to a point at which a space between the pole layer and the shield layer starts to be greater than a space between the pole layer and the shield layer taken in the medium facing surface, and WG is the space between the pole layer and the shield layer taken in the medium facing surface; and an indicator value is 85% or greater, the indicator value being the ratio of a residual output to an initial output expressed in percent, the initial output and the residual output being determined through: first, performing writing of a first signal of 130 kFCI (where FCI is the number of flux inversions per one inch) once in each sector of a track of the recording medium, then reading the first signal from the track on which the first signal was written and obtaining a mean value of a read output of the first signal, the mean value being defined as the initial output; and next, performing writing of a second signal of 50 kFCI 300 times at a head portion of each sector in which the first signal was written, then reading the first signal from a portion of each sector in which the first and second signals were written, the portion being other than the head portion in which the second signal was written, and obtaining a mean value of a read output of the first signal, the mean value being defined as the residual output.

8. The magnetic head according to claim 7, wherein a value of WG is greater than zero and smaller than or equal to 200 nm.

9. The magnetic head according to claim 7, wherein a value of NH/TH is greater than zero and smaller than or equal to 0.5.

10. A head gimbal assembly comprising:

a slider including a magnetic head for perpendicular magnetic recording and disposed to face toward a recording medium; and a suspension flexibly supporting the slider, wherein:

the magnetic head comprises:

a medium facing surface that faces toward the recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium through the use of a perpendicular magnetic recording system;

a shield layer having an end face located in the medium facing surface and having a portion that is located away from the medium facing surface and coupled to the pole layer; and a gap layer made of a nonmagnetic material and provided between the pole layer and the shield layer, in the medium facing surface, the end face of the shield layer is located forward of the end face of the pole layer along a direction of travel of the recording medium with a specific space;

the pole layer incorporates: a track width defining portion that has a first end located in the medium facing surface and a second end opposite to the first end, and that defines the track width; and a wide portion coupled to the second end of the track width defining portion and having a width greater than a width of the track width defining portion;

a value of NH×TH/WG is greater than zero and smaller than or equal to 0.85 μm, where NH is a distance from the medium facing surface to a boundary between the track width defining portion and the wide portion, TH is a distance from the medium facing surface to a point at which a space between the pole layer and the shield layer starts to be greater than a space between the pole layer and the shield layer taken in the medium facing surface, and WG is the space between the pole layer and the shield layer taken in the medium facing surface; and an indicator value is 85% or greater, the indicator value being the ratio of a residual output to an initial output expressed in percent, the initial output and the residual output being determined through: first, performing writing of a first signal of 130 kFCI (where FCI is the number of flux inversions per one inch) once in each sector of a track of the recording medium, then reading the first signal from the track on which the first signal was written and obtaining a mean value of a read output of the first signal, the mean value being defined as the initial output; and next, performing writing of a second signal of 50 kFCI 300 times at a head portion of each sector in which the first signal was written, then reading the first signal from a portion of each sector in which the first and second signals were written, the portion being other than the head portion in which the second signal was written, and obtaining a mean value of a read output of the first signal, the mean value being defined as the residual output.

11. A head arm assembly comprising:

a slider including a magnetic head for perpendicular magnetic recording and disposed to face toward a recording medium;

a suspension flexibly supporting the slider; and an arm for making the slider travel across tracks of the recording medium, the suspension being attached to the arm, wherein:

the magnetic head comprises:

a medium facing surface that faces toward the recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium through the use of a perpendicular magnetic recording system;

a shield layer having an end face located in the medium facing surface and having a portion that is located away from the medium facing surface and coupled to the pole layer; and a gap layer made of a nonmagnetic material and provided between the pole layer and the shield layer, in the medium facing surface, the end face of the shield layer is located forward of the end face of the pole layer along a direction of travel of the recording medium with a specific space;

the pole layer incorporates: a track width defining portion that has a first end located in the medium facing surface and a second end opposite to the first end, and that defines the track width; and a wide portion coupled to the second end of the track width defining portion and having a width greater than a width of the track width defining portion;

a value of NH×TH/WG is greater than zero and smaller than or equal to 0.85 μm, where NH is a distance from the medium facing surface to a boundary between the track width defining portion and the wide portion, TH is a distance from the medium facing surface to a point at which a space between the pole layer and the shield layer starts to be greater than a space between the pole layer and the shield layer taken in the medium facing surface, and WG is the space between the pole layer and the shield layer taken in the medium facing surface; and an indicator value is 85% or greater, the indicator value being the ratio of a residual output to an initial output expressed in percent, the initial output and the residual output being determined through: first, performing writing of a first signal of 130 kFCI (where FCI is the number of flux inversions per one inch) once in each sector of a track of the recording medium, then reading the first signal from the track on which the first signal was written and obtaining a mean value of a read output of the first signal, the mean value being defined as the initial output; and next, performing writing of a second signal of 50 kFCI 300 times at a head portion of each sector in which the first signal was written, then reading the first signal from a portion of each sector in which the first and second signals were written, the portion being other than the head portion in which the second signal was written, and obtaining a mean value of a read output of the first signal, the mean value being defined as the residual output.

12. A magnetic disk drive comprising:

a slider including a magnetic head for perpendicular magnetic recording and disposed to face toward a circular-plate-shaped recording medium that is driven to be rotated; and an alignment device supporting the slider and aligning the slider with respect to the recording medium, wherein:

the magnetic head comprises:

a medium facing surface that faces toward the recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium through the use of a perpendicular magnetic recording system;

a shield layer having an end face located in the medium facing surface and having a portion that is located away from the medium facing surface and coupled to the pole layer; and a gap layer made of a nonmagnetic material and provided between the pole layer and the shield layer, wherein:

in the medium facing surface, the end face of the shield layer is located forward of the end face of the pole layer along a direction of travel of the recording medium with a specific space;

the pole layer incorporates: a track width defining portion that has a first end located in the medium facing surface and a second end opposite to the first end, and that defines the track width; and a wide portion coupled to the second end of the track width defining portion and having a width greater than a width of the track width defining portion;

a value of NH×TH/WG is greater than zero and smaller than or equal to 0.85 μm, where NIT is a distance from the medium facing surface to a boundary between the track width defining portion and the wide portion, TH is a distance from the medium facing surface to a point at which a space between the pole layer and the shield layer starts to be greater than a space between the pole layer and the shield layer taken in the medium facing surface, and WG is the space between the pole layer and the shield layer taken in the medium facing surface; and an indicator value is 85% or greater, the indicator value being the ratio of a residual output to an initial output expressed in percent, the initial output and the residual output being determined through: first, performing writing of a first signal of 130 kFCI (where FCI is the number of flux inversions per one inch) once in each sector of a track of the recording medium, then reading the first signal from the track on which the first signal was written and obtaining a mean value of a read output of the first signal, the mean value being defined as the initial output; and next, performing writing of a second signal of 50 kFCI 300 times at a head portion of each sector in which the first signal was written, then reading the first signal from a portion of each sector in which the first and second signals were written, the portion being other than the head portion in which the second signal was written, and obtaining a mean value of a read output of the first signal, the mean value being defined as the residual output.

\* \* \* \* \*